United States Patent
Zhu et al.

(10) Patent No.: US 8,448,001 B1
(45) Date of Patent: May 21, 2013

(54) SYSTEM HAVING A FIRST DEVICE AND SECOND DEVICE IN WHICH THE MAIN POWER MANAGEMENT MODULE IS CONFIGURED TO SELECTIVELY SUPPLY A POWER AND CLOCK SIGNAL TO CHANGE THE POWER STATE OF EACH DEVICE INDEPENDENTLY OF THE OTHER DEVICE

(75) Inventors: Jun Zhu, San Jose, CA (US); Ian Swarbrick, Sunnyvale, CA (US); Joseph Jun Cao, Los Gatos, CA (US); Sheng Lu, Fremont, CA (US); Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 523 days.

(21) Appl. No.: 12/715,612

(22) Filed: Mar. 2, 2010

Related U.S. Application Data

(60) Provisional application No. 61/156,662, filed on Mar. 2, 2009.

(51) Int. Cl.
    G06F 1/00    (2006.01)
    G06F 1/32    (2006.01)
    G06F 1/26    (2006.01)

(52) U.S. Cl.
    USPC ............................ 713/322; 713/320; 713/323

(58) Field of Classification Search
    USPC .......................................... 713/320, 322, 323
    See application file for complete search history.

(56) References Cited

U.S. PATENT DOCUMENTS

| | | | | |
|---|---|---|---|---|
| 5,546,591 A | * | 8/1996 | Wurzburg et al. | 713/322 |
| 6,446,214 B2 | * | 9/2002 | Chrysanthakopoulos | 713/310 |
| 7,412,614 B2 | * | 8/2008 | Ku | 713/321 |
| 2002/0053039 A1 | * | 5/2002 | Inoue et al. | 713/323 |
| 2004/0019814 A1 | * | 1/2004 | Pappalardo et al. | 713/300 |
| 2004/0199796 A1 | * | 10/2004 | Boros | 713/300 |
| 2009/0249098 A1 | * | 10/2009 | Han et al. | 713/322 |
| 2009/0282275 A1 | * | 11/2009 | Yermalayeu et al. | 713/320 |
| 2011/0010566 A1 | * | 1/2011 | Bandholz et al. | 713/300 |

OTHER PUBLICATIONS

AMBA AXI Protocol, V1.0, Specification; 2003, 2004 ARM Limited; 108 pages.

Advanced Configuration and Power Interface Specification, Revision 4.0; Hewlett-Packard Corporation, Intel Corporation, Microsoft Corporation, Phoenix Technologies Ltd., Toshiba Corporation; Jun. 16, 2009; 727 pages.

* cited by examiner

Primary Examiner — Chun Cao
Assistant Examiner — Terrell Johnson

(57) ABSTRACT

A system includes a first device, a second device, and a main power management module. The first device is configured to communicate with a system bus. The second device is configured to communicate with the system bus. The second device includes a device power management module configured to manage power states of the second device. The main power management module is configured to manage power consumption of the second device independently of the first device by selectively supplying power and clock signals to the second device based on the power states of the second device. The main power management module and the device power management module each comprise a power handshake interface. The main power management module communicates with the device power management module via a power management bus using the power handshake interface.

17 Claims, 24 Drawing Sheets

SYSTEM HAVING A FIRST DEVICE AND SECOND DEVICE IN WHICH THE MAIN POWER MANAGEMENT MODULE IS CONFIGURED TO SELECTIVELY SUPPLY A POWER AND CLOCK SIGNAL TO CHANGE THE POWER STATE OF EACH DEVICE INDEPENDENTLY OF THE OTHER DEVICE

CROSS-REFERENCE TO RELATED APPLICATIONS

This application claims the benefit of U.S. Provisional Application No. 61/156,662, filed on Mar. 2, 2009. The disclosure of the above application is incorporated herein by reference in its entirety.

FIELD

The present disclosure relates to power management and more particularly to self-governing power management architecture for computing systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Computing systems (systems) may be powered by batteries and/or wall outlets. Minimizing power consumption of systems can yield several benefits. For example, minimizing power consumption of battery-powered systems (e.g., handheld devices) can increase battery life. Minimizing power consumption of systems powered by wall outlets (e.g., servers) can reduce cooling costs.

Power consumption in a system may be controlled by operating one or more subsystems and devices (collectively components) of the system in a low-power mode. For example, when a component is not used for a certain period of time, the component may be operated in a low-power mode (also referred to herein as a sleep mode or power-save mode). In sleep mode, a component may receive less than normal power, or the power to the component may be turned off. Normal power to the component can be restored in response to operation of the component being once again required by the system.

SUMMARY

A system includes a first device, a second device, and a main power management module. The first device is configured to communicate with a system bus. The second device is configured to communicate with the system bus. The second device includes a device power management module configured to manage power states of the second device. The main power management module is configured to manage power consumption of the second device independently of the first device by selectively supplying power and clock signals to the second device based on the power states of the second device. The main power management module and the device power management module each comprise a power handshake interface. The main power management module communicates with the device power management module via a power management bus using the power handshake interface.

In other features, the system described above may be implemented using a computer program executed by one or more processors. The computer program can reside on a computer readable medium such as but not limited to memory, nonvolatile data storage, and/or other suitable tangible storage media.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1A:
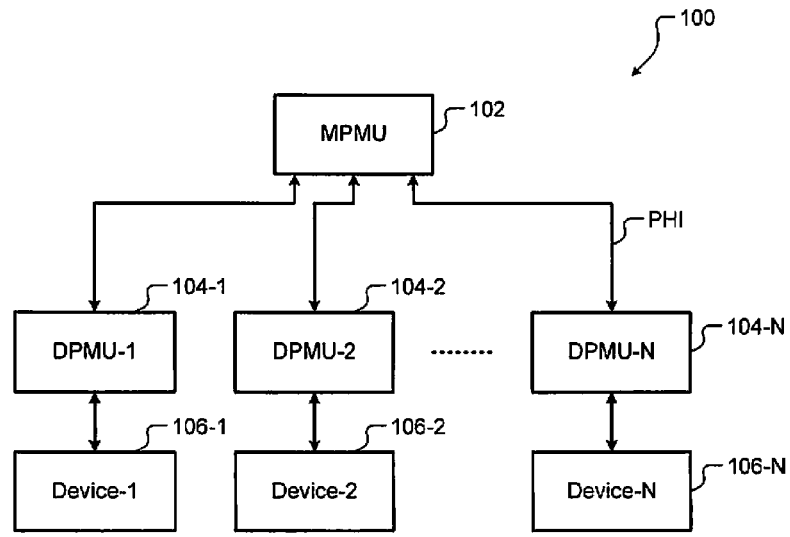
FIGS. 1A and 1B are functional block diagrams of a power management architecture.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. Additionally, the term unit is synonymous and interchangeable with the term module.

A system typically includes a power management unit (PMU) that manages power consumption of components of the system. A PMU can manage power consumption when a system is in an active mode as well as in a standby mode. For example, a PMU can manage dynamic power when the system is in the active mode, and the PMU can manage leakage power when the system is in the standby mode.

The PMU manages the power consumption by controlling generation and distribution of power, clock, and reset signals to various components of the systems. Additionally, the PMU controls power states of the components. For easy reference, controlling power, clock, reset, and power states is also referred to herein as power control, clock control, reset control, and power state control, respectively.

Power control can include controlling a primary power supply that supplies power to various components of a system. The primary power supply can be turned on or off based on the usage of system. Alternatively, portions of the primary power supply that generate power for particular components of the system can be turned on or off based on the usage of those components. Additionally, power supplied by the primary power supply to various components of the system can be adjusted based on the usage of the components.

Clock control can include controlling sources of clock signals and generation and distribution of clock signals to various components based on the usage of the components. The sources of clock signals can include phase locked loops (PLLs), oscillators (OSCs), etc. The generation and distribution of clock signals can include multiplying, dividing, multiplexing, gating, and switching various clock signals.

The term gating refers to temporarily removing (e.g., disconnecting or not supplying) a particular resource (e.g., clock and/or power supply). Thus, clock gating refers to removal of clock signals from a device, and power gating refers to removal of power supply from a device. Power gating reduces overall leakage power, which in turn reduces overall power consumption on the system.

The clock signals can include primary clocks and secondary clocks. The primary clocks can include CPU core clocks, bus clocks, and memory clocks. The secondary clocks can include clocks for different functional units of the system (e.g., a liquid-crystal display (LCD), an audio device, etc.). One or more of the primary/secondary clocks may not be generated and/or distributed based on the usage of corresponding functional units.

Reset control can include determining when to generate reset signals. The reset signals can include power on reset (POR), hardware reset, I/O reset, subsystem/device resets, etc.

Power state control can include controlling power states of various components and determining when the components transition from one state to another. The power states can include an active state, a low active state, a standby state, a sleep state, and a power off state. The power states are generally described in a hierarchical manner as system states (Sx), device states (Dx), and CPU core states (Cx), where X=0, 1, 2, etc. A state with a lower value of X denotes a higher power consuming state and a higher performing state than a state with a higher value of X. For example, S0 is the highest power consuming state and the best performing state. Conversely, higher numbered states consume less power and have lower performance and slower response times than lower numbered states. The power states are described in Advanced Configuration and Power Interface (ACPI) Specification, which is incorporated herein by reference in its entirety.

Majority of current power management architectures are software-centric. That is, software is used to control the power management performed by the PMUs. Software-centric PMUs suffer from many drawbacks. For example, a CPU or a CPU core must typically stay powered on to run the software. CPU cores typically consume more power than other components of the systems. Accordingly, power consumption can be reduced using software controls but in a limited manner.

Additionally, software controls may be slow. Accordingly, one or more components may have to wake up from a sleep mode and return to a full-power mode (e.g., normal mode) ahead of a scheduled wake-up time. Waking up ahead of time increases overall awake time of components, which increases power consumption instead of decreasing it. Thus, the software-centric PMUs may be inefficient.

Further, the software-centric PMUs may be prone to errors. For example, a path from a module that interfaces the PMU to the CPU core may be accidently powered down due to software errors. Consequently, the system may be unable to recover from sleep mode. In addition, when components and corresponding device drivers of the system are developed by different vendors, coordinating development of power-aware device drives can be difficult. Thus, software-centric PMUs have at least these drawbacks.

The present disclosure relates to a hardware-based hierarchical power management architecture (hereinafter PMA). In one implementation, the PMU architecture decreases power consumption by making wake up time of components more precise relative to a conventional software-centric PMU. Due to the more precise wake up times, the components need not wake up ahead of time, thereby saving additional power. Additionally, the PMA decreases power consumption by minimizing the use of software controls. Due to reduced software controls, the CPU can stay in power save mode for a longer period of time relative to a conventional software-centric PMU.

The power management architecture includes a main PMU (MPMU) per system, and a device PMU (DPMU) per device of the system. For example only, a device can be a memory control module. Optionally, the power management architecture can include a subsystem PMU (SPMU) per subsystem, where the subsystem may control a group of devices. For example only, an audio-video subsystem may control an audio device (e.g., an audio controller) and a video device (e.g., a video controller).

The MPMU communicates with DPMUs and SPMUs via a power handshake interface (PHI). Each SPMU communicates with DPMUs via the PHI. Throughout the disclosure, each unit (e.g., the MPMU, SPMUs, and DPMUs) and each interface (e.g., the PHI and interfaces included in the PHI) is a module. Specifically, the terms MPMU, SPMU, DPMU, interface mean main power management module, subsystem power management module, device power management module, and interface module, respectively. Further, each device associated with and/or comprising a DPMU is a device control module.

Figure 1B:
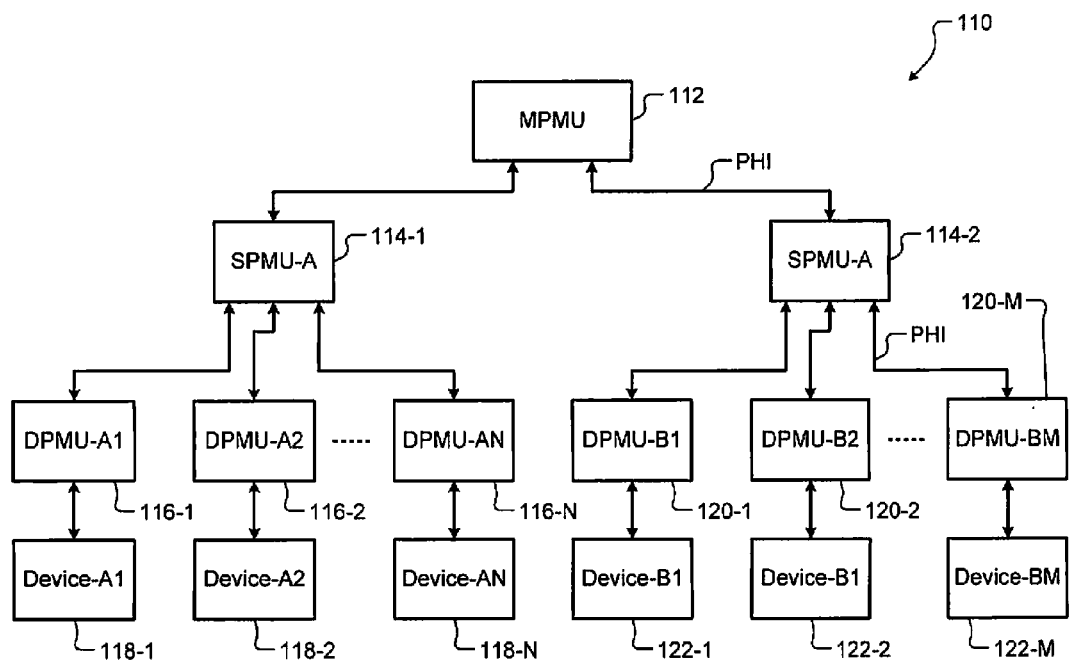
Figure 2:
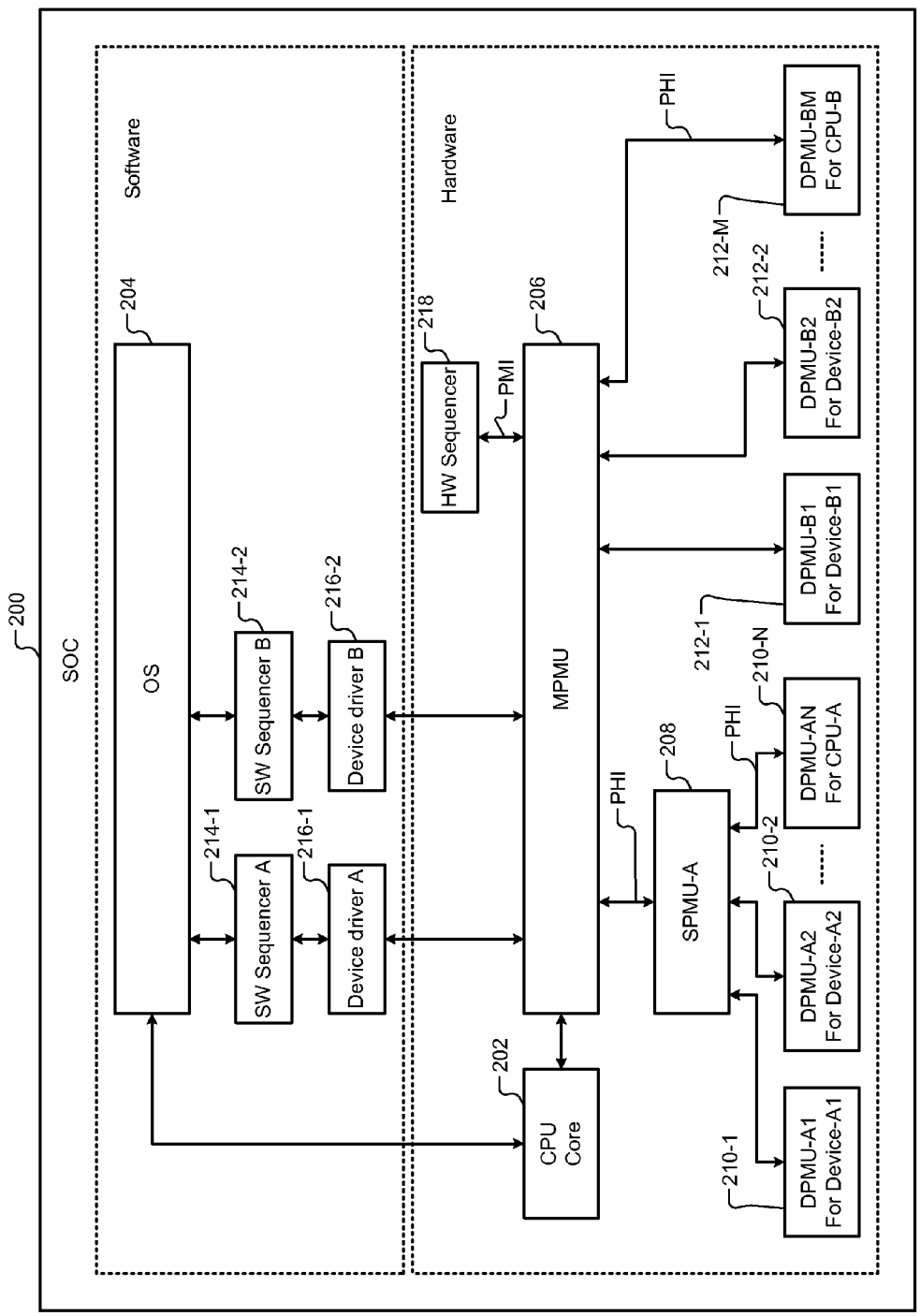
FIG. 2 is a functional block diagram of a system depicting components relevant to power management.
Figure 8A:
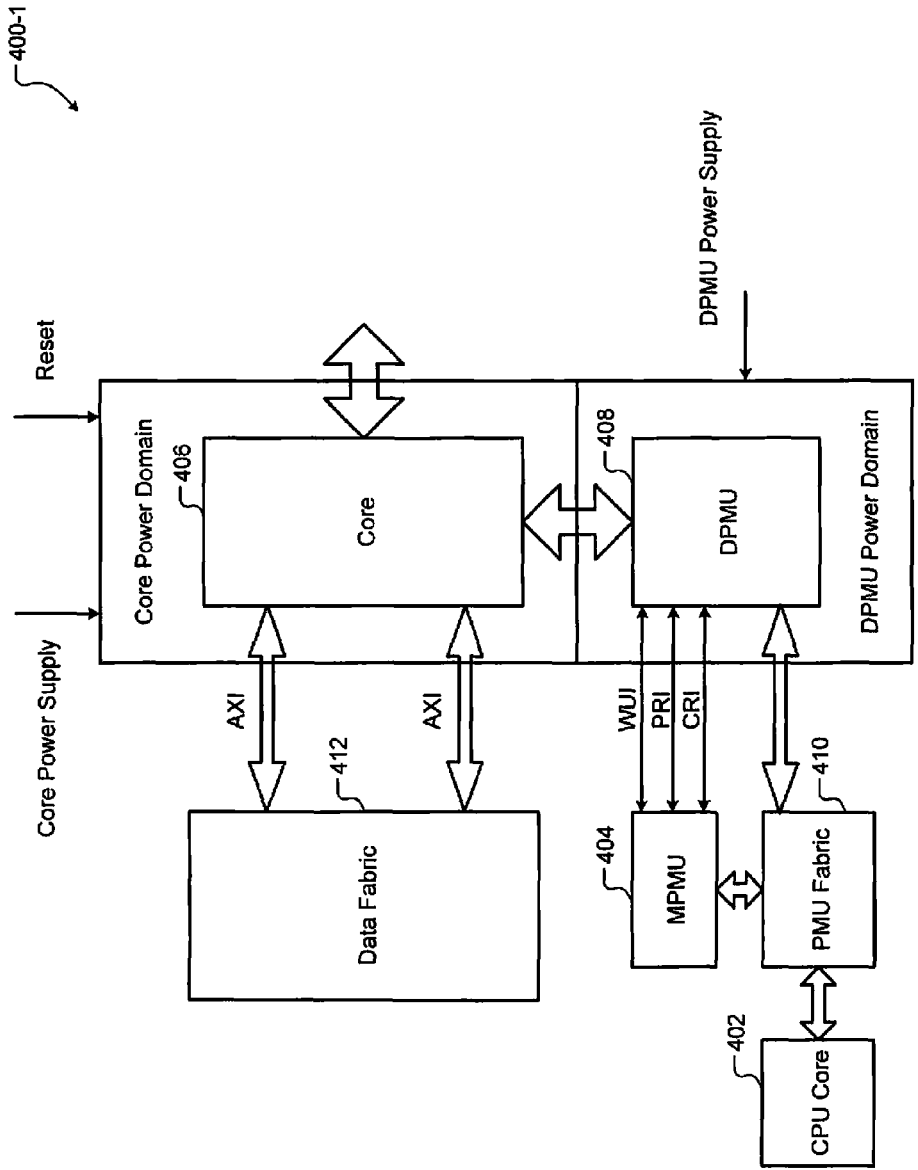
FIGS. 8A-8C are functional block diagrams of a system-on-chip (SOC) depicting different ways of interfacing with a DPMU.
Figure 8B:
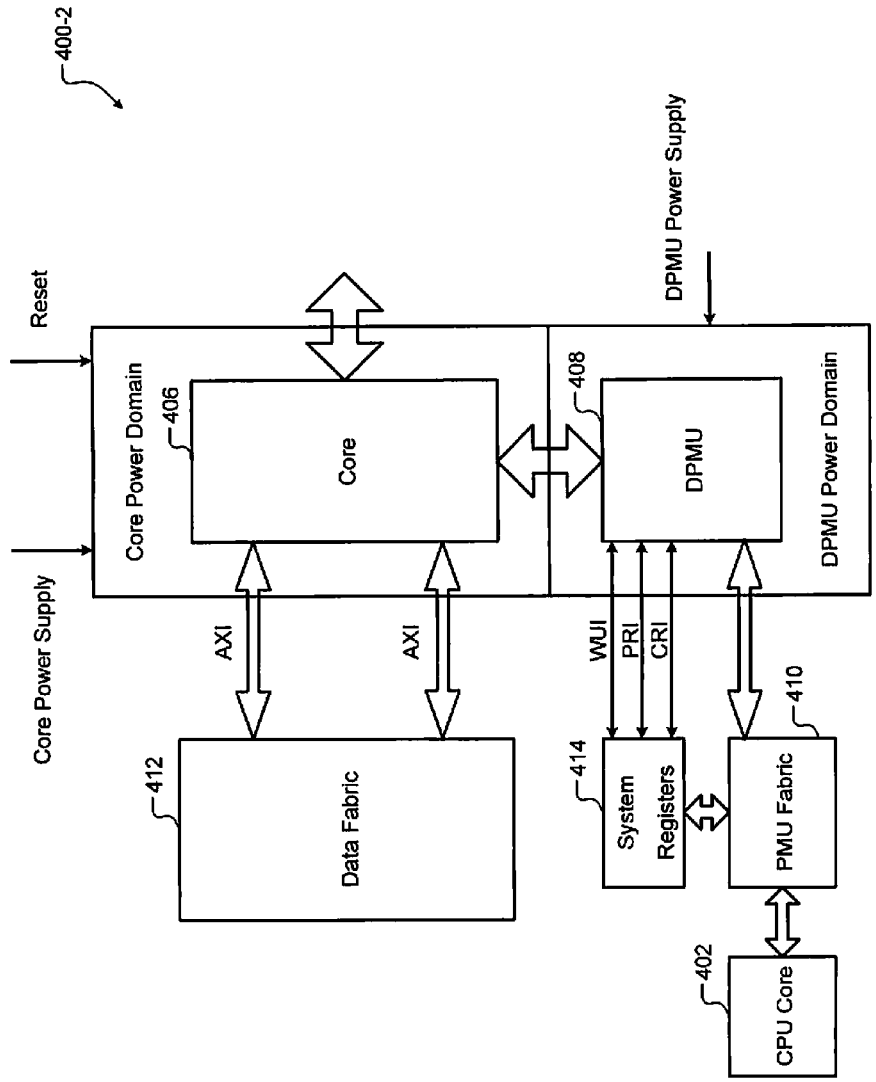
Figure 8C:
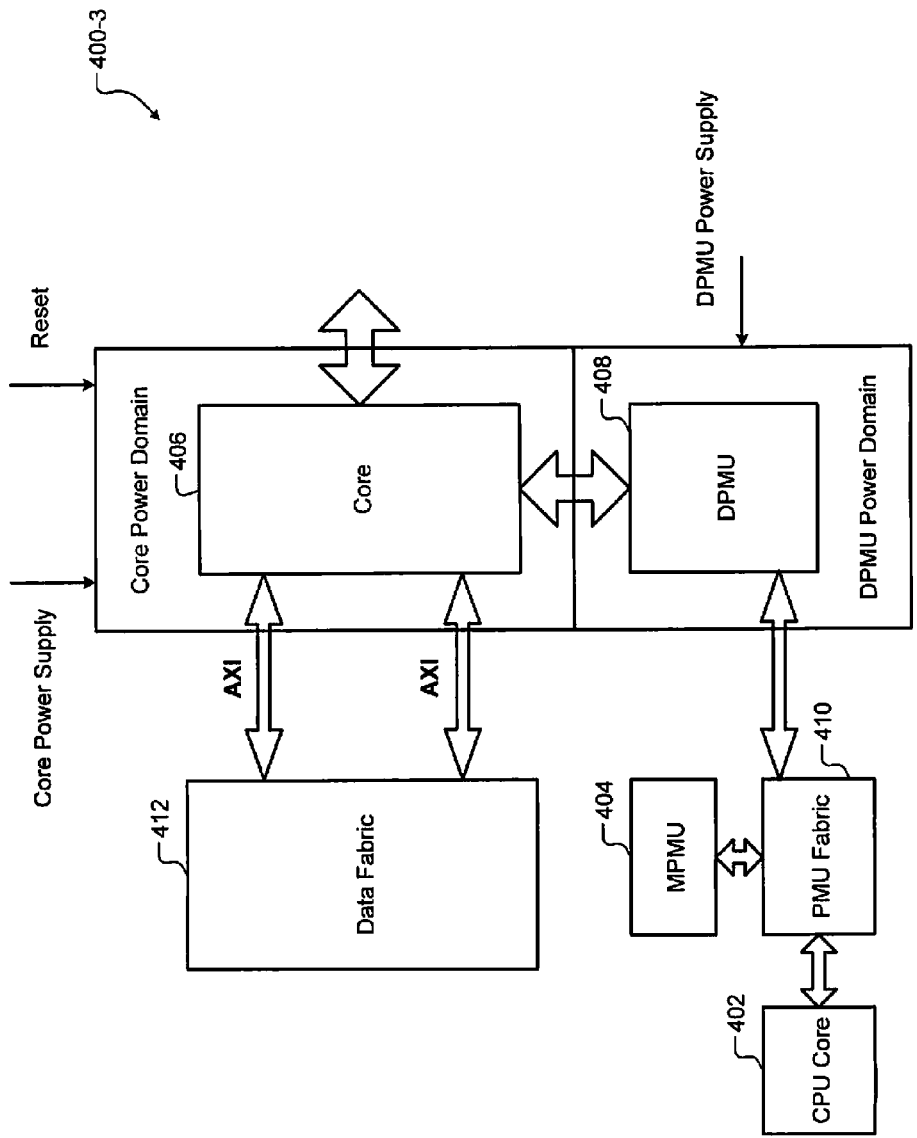
Figure 9:
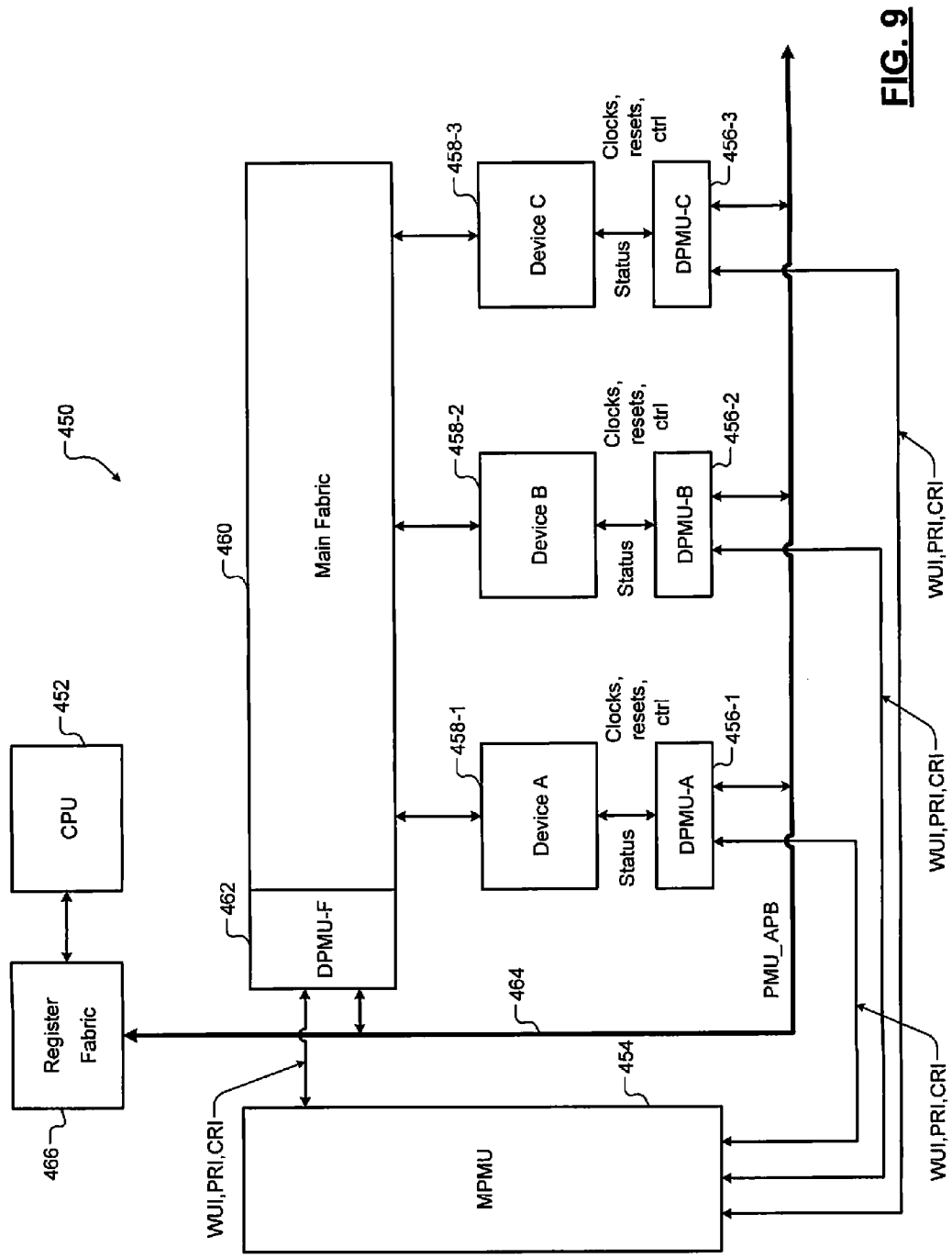
FIG. 9 is a functional block diagram of an SOC that implements the power management architecture.
Figure 10:
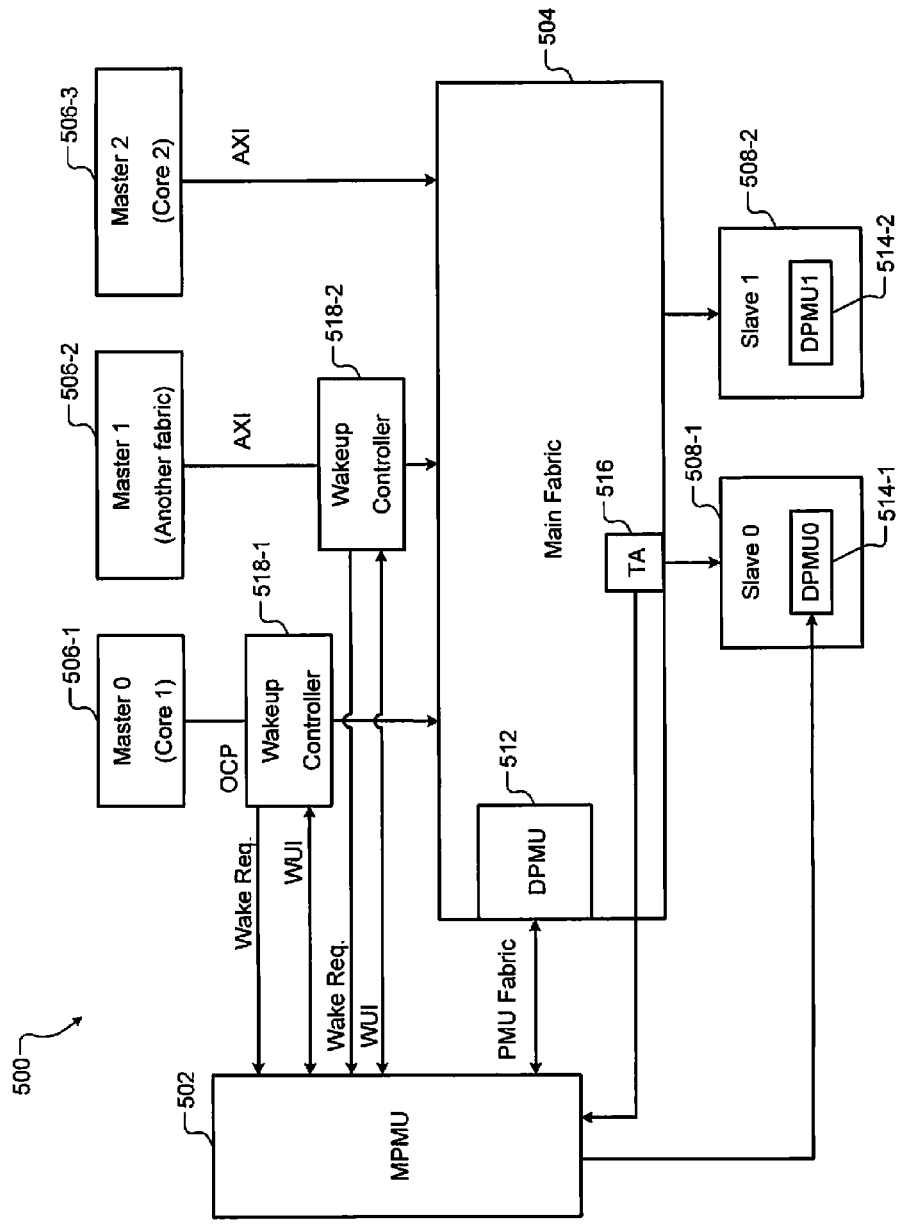
FIG. 10 is a functional block diagram of an SOC depicting power-aware fabric components.

The present disclosure is organized as follows. In FIGS. 1A and 1B, an overview the PMA is shown. In FIG. 2, software and hardware portions of systems that are relevant to power management are shown. In FIGS. 3-6, the MPMU, SPMU, DPMU, and PHI are shown in detail. In FIGS. 7A-7H, handshaking signals of the PHI are shown. In FIGS. 8A-8C, different ways of interfacing with the DPMU are shown. In FIG. 9, an example of an implementation of the PMA is shown. In FIG. 10, power-aware fabric components of an SOC are shown. In FIGS. 11A-11E, examples of wake up handshaking using the PMA are shown.

FIGS. 1A and 1B illustrate an overview various power management architectures. As shown in FIG. 1A, a PMU architecture 100 includes a MPMU 102 and DPMUs 104-1, 104-2, . . . , and 104-N (collectively DPMUs 104). The DPMUs 104 manage power consumption of Device-1 106-1, Device-2 106-2, . . . , and Device-N 106-N (collectively devices 106). The MPMU 102 communicates with each of the DPMUs 104 via the PHI. The MPMU 102 and each of the DPMUs 104 include the PHI. That is, the PHI is a component of each of the MPMU 102 and the DPMUs 104. In one implementation, a PMU bus dedicated to power management interconnects the PHI of the MPMU 102 and to the PHIs of the DPMUs 104.

As shown in FIG. 1B, a power management architecture 110 includes a MPMU 112, SPMU-A 114-1 and SPMU-B 114-2 (collectively SPMUs 114), and one or more DPMUs per SPMU 114. The MPMU 112 communicates with the SPMUs 114 via the PHI.

The SPMU-A 114-1 manages power consumption of Device-A1 116-1, Device-A2 116-2, . . . , and Device-AN 116-N (collectively devices 116). The SPMU-A 114-1 manages power consumption of the devices 116 via DPMU-A1 118-1, DPMU-A2 118-2, . . . , and DPMU-AN 118-N (collectively DPMUs 118), respectively. The SPMU-B 114-2 manages power consumption of Device-B1 120-1, Device-B2 120-2, . . . , and Device-BN 120-N (collectively devices 120). The SPMU-B 114-2 manages power consumption of the devices 120 via DPMU-A1 122-1, DPMU-A2 122-2, . . . , and DPMU-AN 122-N (collectively DPMUs 122), respectively. The SPMUs 114 communicate with the DPMUs 118 and DPMUs 122 via the PHI.

Each of the SPMUs 114, the DPMUs 118, and the DPMUs 122 includes the PHI. The PMU bus interconnects the PHIs of the SPMUs 114, the DPMUs 118, and the DPMUs 122. Additionally, the PMU bus interconnects the PHI of the MPMU 112 to the PHIs of the SPMUs 114. A detailed description of the power management architecture 110 and various components of the PMU architecture is provided below.

The power management architecture 110 can co-exist with a software-centric PMA. The PMU architecture can minimize the role of software controls in power management. Accordingly, the power management architecture 110 can eliminate or minimize the drawbacks of conventional software-centric power management architectures and provide additional benefits.

For example, since the PMA 110 reduces the amount of software control in power management, CPU cores can stay in the power-save mode for longer periods relative to a conventional software-centric PAM. Additionally, wake up times of the components can be more precise relative to those associated with a conventional software-centric PMU. Consequently, overall awake time of the components is reduced.

Additionally, the PMA 110 provides other benefits. Specifically, the hierarchical structure of the PMA 110 allows for scaling. For example, devices and subsystems can be easily added or deleted from the PMA 110. Additionally, the MPMU can communicate directly with the SPMUs and DPMUs without CPU intervention. That is, the MPMU performs power management by bypassing or independently of the CPU.

Further, (in one implementation) normal read/write commands instead of special commands can be used to wake up devices containing DPMUs. Accordingly, when the MPMU reads/writes to a particular SPMU or DPMU, the SPMUs and DPMUs that are in the path from the MPMU to the particular SPMU or DPMU wake up automatically. For example, a memory controller with a DPMU can wake up from a low power state when a bus master (e.g., a CPU) outputs normal read/write commands to access memory. No special commands or sequences are necessary to first wake up the memory controller before read/write operations can be performed on the memory.

In addition, (in one implementation) clock gating points and reset generation points for a device are centralized in the DPMU of a device instead of being distributed throughout the device. Centralizing the clock gating and reset generation points in the DPMU facilitates design for test (DFT) processes.

Before describing the PMA 110 in detail, software and hardware portions of a system (e.g., a system-on-chip (SOC)) that are relevant to power management are introduced below. Throughout the disclosure, the SOC is used as an example only. The teachings of the disclosure are applicable to other systems including desktop computers, servers, etc.

Referring now to FIG. 2, components of a system (e.g., an SOC) 200 relevant to power management are shown. For example only, systems such as cellular phones, personal digital assistants (PDAs), notebook computers, servers, and so on may include the SOC 200.

The SOC 200 includes a CPU core 202 that runs an operating system (OS) 204, an MPMU 206, an SPMU-A 208, and a plurality of DPMUs. The DPMUs include DPMU-A1 210-1, DPMU-A2 210-2, . . . , and DPMU-N 210-N (collectively DPMUs 210), and DPMU-B1 212-1, DPMU-B2 212-2, . . . , and DPMU-M 212-M (collectively DPMUs 212).

The DPMUs 210 manage power consumption of Device-A1, Device-A2, . . . , and CPU-A of a subsystem A (collectively Devices A). The DPMUs 212 manage power consumption of Device-B1, Device-B2, . . . , and CPU-B (collectively Devices B) of the SOC 200. The DPMUs 210 and 212 can be included in Devices A and Devices B, respectively. The MPMU 206, the SPMU-A 208, the DPMUs 210, and the DPMUs 212 manage power consumption of the Devices A and Devices B.

Additionally, the SOC 200 includes a software sequencer A 214-1 and a software sequencer B 214-2 (collectively software sequencers 214). Further, the SOC 200 may include a device driver A 216-1 and a device driver B 216-2 (collectively device drivers 216). The software sequencers 214 and the device drivers 216 partly manage the power consumption of Devices A and Devices B based on resources used by an application executed by the SOC 200.

Occasionally, resources such as PLLs, OSCs, and so on may be added, deleted, or modified. Additionally or alternatively, devices such as Devices A and/or Device B may be added, deleted, or modified. When the resources and/or devices are altered, the power consumption of the resources can be managed by updating a hardware sequencer 218 instead of, or in addition to, updating the software sequencers 214.

The MPMU 206 communicates with each of the SPMU-A 208, DPMUs 210, and DPMUs 212 via the PHI. The MPMU 206 communicates with the hardware sequencer 218 via a power management interface (PMI). Additionally, the MPMU 206 communicates with the software sequencers 214 and the CPU core 202 via a system bus. The software sequencers 214 and the hardware sequencer 218 generate power up/power down sequences for the SPMU-A 208, DPMUs 210, and DPMUs 212.

Figure 3:
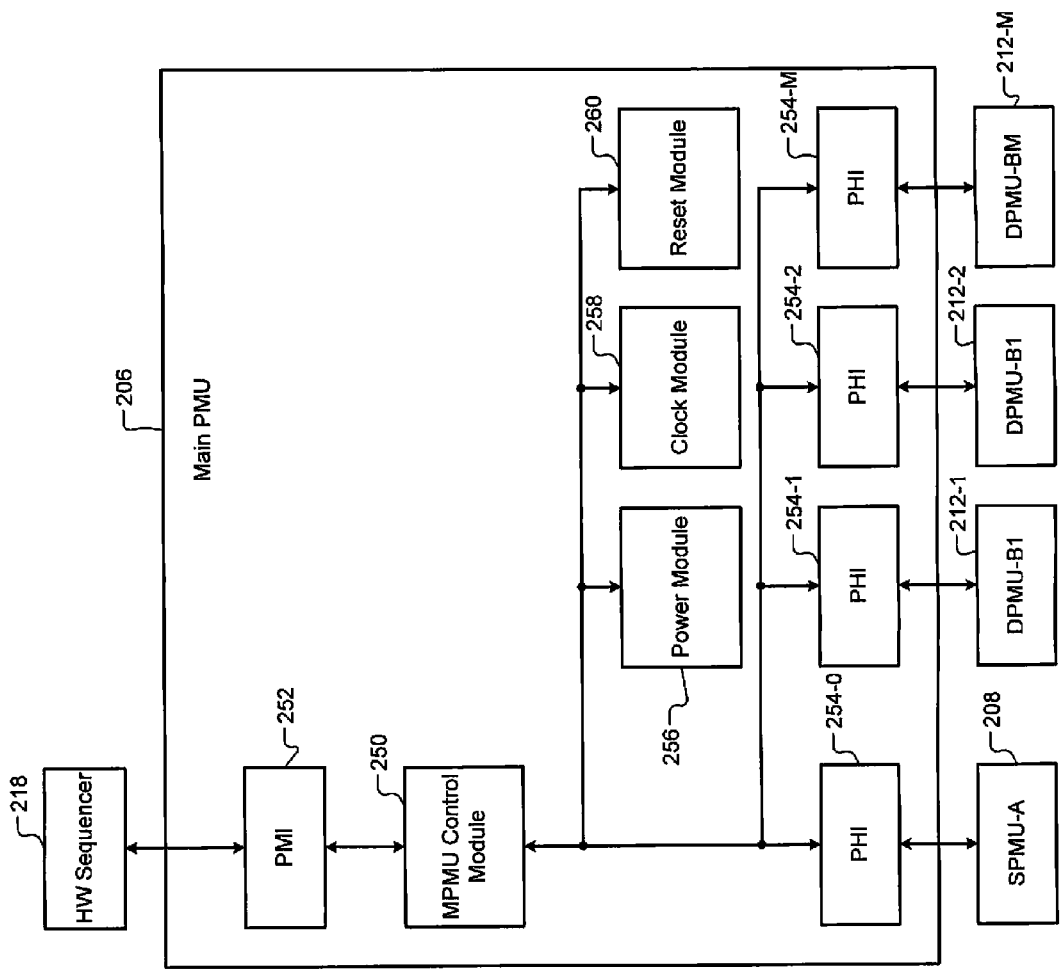
FIG. 3 is a functional block diagram of a main power management unit (MPMU) of the power management architecture.

Referring now to FIG. 3, the MPMU 206 includes system-wide centralized resources (hereinafter resources). For example, the resources can include power supplies, clock generators, reset generators, and so on. The MPMU 206 includes an MPMU control module 250 that generates control signals to control the resources. The MPMU control module 250 generates the control signals based on current states of SPMUs and DPMUs stored in the MPMU 206 and based on sequences generated by the software sequences 214 and the hardware sequencer 218. The MPMU control module 250 communicates with the CPU core 202 via the system bus.

The MPMU 206 includes a PMI 252 for communicating with the hardware sequencer 218. Additionally, the MPMU 206 includes a PHI per SPMU connected to the MPMU 206 and a PHI per DPMU connected to the MPMU 206. For example, in the SOC 200 shown in FIG. 2, the MPMU 206 is connected to the SPMU-A 208 and the DPMUs 212. Accordingly, the MPMU 206 includes PHIs 254-0, 254-1, 254-2, . . . , and 254-M (collectively PHIs 254) that connect the MPMU 206 to the SPMU-A 208 and the DPMUs 212.

Further, the MPMU 206 includes a bus interface (described below) to allow access to power management control registers of DPMUs. The MPMU 206 also includes an inter-integrated circuit (I2C) interface to communicate with a power management IC (PMIC) (not shown) that may be included in the SOC 200.

The MPMU 206 further includes a power module 256, a clock module 258, and a reset module 260. The power module 256, the clock module 258, and the reset module 260 generate and control power, clock, and reset resources of the SOC 200, respectively. The generation and control of the resources is based on the control signals generated by the MPMU control module 250.

Specifically, the power module 256 includes system-wide power supplies and controls internal and external power supplies. For example, the power module 256 controls on-die DC-DC converters, power regulators, and the PMIC. The power module 256 adjusts voltages generated by the power supplies and turns the power supplies on or off based on the control signals generated by the MPMU control module 250.

The SOC 200 can include a plurality of power domains. Devices of the SOC 200 may be grouped in power domains depending on types of power supplies used by the devices. The power module 256 controls power gating for the power domains of the SOC 200. For example, the power module 256 controls I/O power and SPMU power.

For each power domain of the SOC 200, the power module 256 includes a power state table. The power state table for a power domain stores current voltage level and current power state (on or off) for the SPMUs and/or DPMUs in the power domain. The power module 256 controls the power state of the SPMUs and/or DPMUs based on the current voltage level and power state of the SPMUs and/or DPMUs. Additionally, the power module 256 controls the power state of the SPMUs and/or DPMUs based on the control signals generated by the MPMU control module 250. The power module 256 and the SPMU-A 208 together control the system power states (Sx).

The clock module 258 includes clock generators (e.g., PLLs and OSCs) that generate clocks. The clock module 258 controls the clock generators and external clock inputs according to the control signals generated by the MPMU control module 250. For example, the clock module 258 changes clock frequencies and turns clocks on or off based on the control signals generated by the MPMU control module 250.

The SOC 200 can include a plurality of clock domains. Devices of the SOC 200 can be grouped in clock domains depending on types of clock signals used by the devices. For each clock domain of the SOC 200, the clock module 258 includes a clock state table. The clock state table for a clock domain includes current clock frequency and current clock state (on or off) for the SPMUs and/or DPMUs in the clock domain. The clock module 258 controls the clock state of the SPMUs and/or DPMUs based on the current clock frequency and clock state of the SPMUs and/or DPMUs. Additionally, the clock module 258 controls the clock state of the SPMUs and/or DPMUs based on the control signals generated by the MPMU control module 250.

The reset module 260 includes reset generators that generate reset signals (e.g., POR, hardware reset, I/O reset, SPMU reset, etc.). The reset module 260 controls generation and gating of the reset signals according to the control signals generated by the MPMU control module 250.

The MPMU control module 250 may also monitor system parameters related to power management. For example, the MPMU control module 250 may monitor the temperature of the SOC 200 or temperatures of particular components of the SOC 200. The MPMU control module 250 may monitor speed of particular components of the SOC 200 (e.g., speed of the CPU core 202). The MPMU control module 250 may control the resources based on the parameters.

Figure 4:
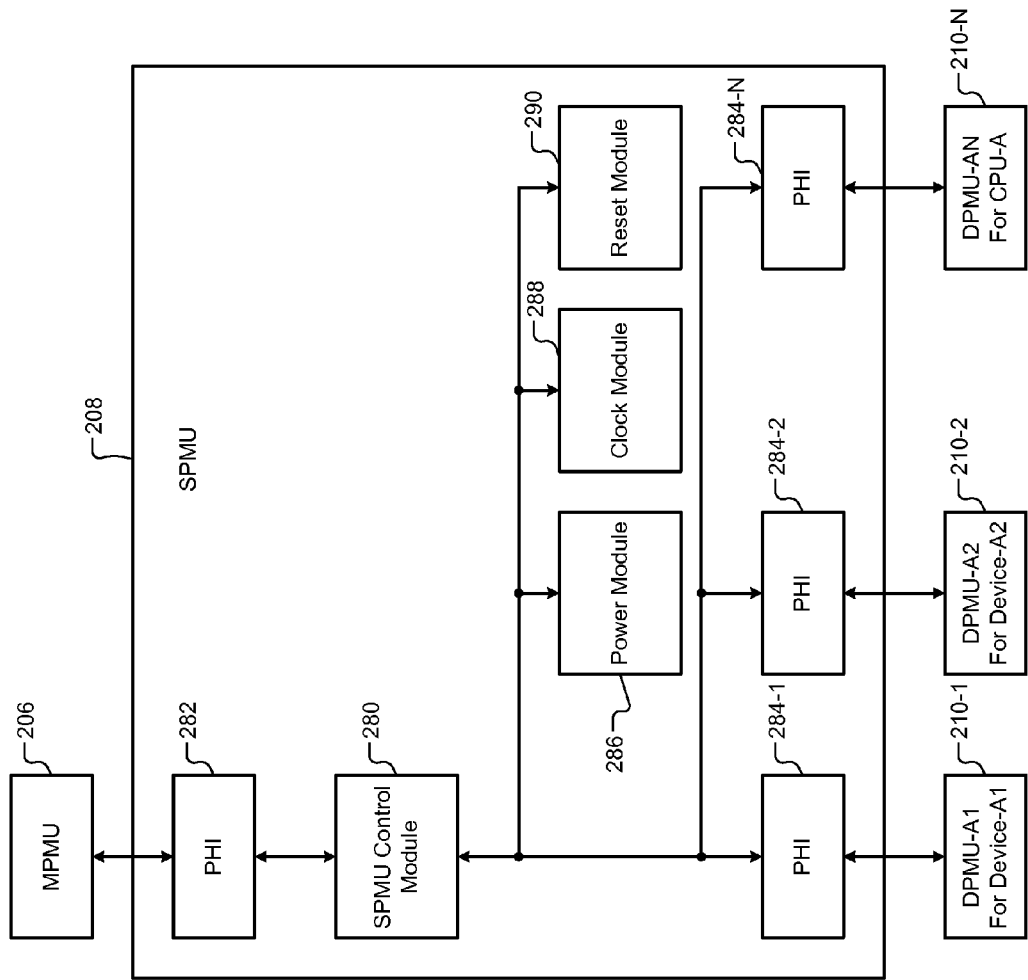
FIG. 4 is a functional block diagram of a subsystem power management unit (SPMU) of the power management architecture.

Referring now to FIG. 4, the SPMU-A 208 is a reduced version of the MPMU 206. The SPMU-A 208 controls resources of the DPMUs 210 of the subsystem A instead of controlling system-wide resources of the SOC 200. The SPMU-A 208 and the MPMU 206 together manage the system power states Sx. The SPMU-A 208 manages device power states Dx and CPU power states Cx of the DPMUs 210.

The SPMU-A 208 includes an SPMU control module 280 that generates control signals to control the resources of the DPMUs 210. The SPMU control module 280 generates the control signals based on signals generated by the MPMU 206 for controlling the resources of the SPMU-A 208.

The SPMU-A 208 includes a PHI 282 to communicate with the MPMU 206. Additionally, the SPMU-A 208 includes a PHI per DPMU connected to the SPMU-A 208. For example, in the SOC 200 shown in FIG. 2, the SPMU-A 208 is connected to the DPMUs 210. Accordingly, the SPMU-A 208 includes PHIs 284-0, 284-1, 284-2, . . . , and 284-N (collectively PHIs 284) that connect the SPMU-A 208 to the DPMUs 210.

The SPMU-A 208 includes a power module 286, a clock module 288, and a reset module 290 that control the power, clock, and reset resources of the subsystem A, respectively. The control is based on the control signals generated by the SPMU control module 280.

For example, the power module 286 controls power gating for power islands of the subsystem A comprising the DPMUs 210. The clock module 288 controls clocks of the subsystem A. For example, the clock module 288 may request the MPMU 206 for a clock adjustment (e.g., a change in PLL frequency). The clock module 288 controls multiplexing, gating, and switching of clocks of the subsystem A. The reset module 290 controls generation of resets for the subsystem A based on the reset controls generated by the MPMU 206 for the subsystem A and by the DPMUs 210.

Figure 5:
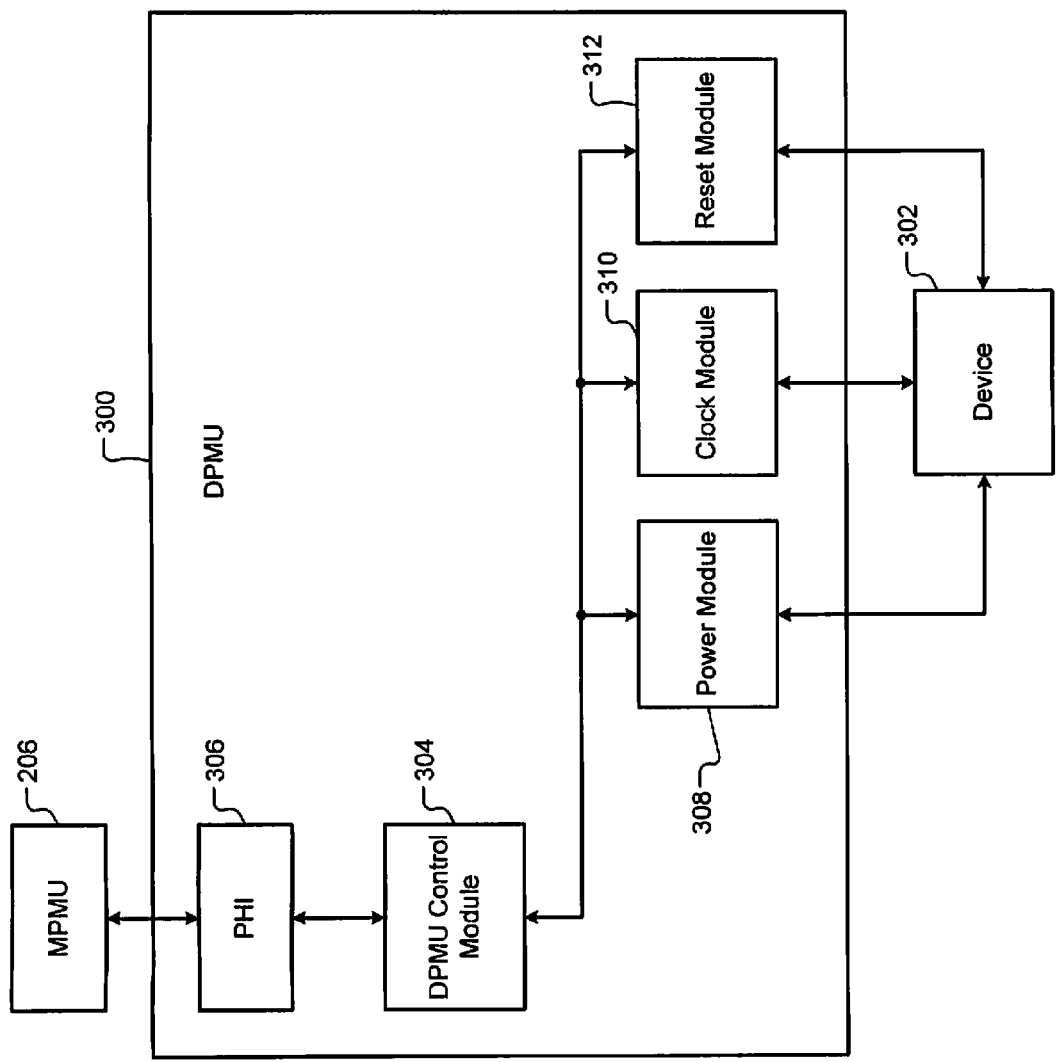
FIG. 5 is a functional block diagram of a device power management unit (DPMU) of the power management architecture.

Referring now to FIG. 5, a DPMU 300 manages resources of a device 302. The DPMU 300 may include one of the DPMUs 210, 212. For example only, the device 302 may include a storage controller. The DPMU 300 includes a DPMU control module 304, a PHI 306, a power module 308, a clock module 310, and a reset module 312. The DPMU 300 communicates with the MPMU 206 (or an SPMU) via the PHI 306.

The DPMU 300 also includes a bus interface to allow access to its power management control registers. For example, the MPMU 206, an SPMU, and/or the CPU core may access the power management control registers of the DPMU 300 via the bus interface.

The DPMU control module 304 generates control signals to control power, clock, and reset resources of the device 302.

The DPMU control module 304 generates the control signals based on signals generated by the MPMU 206 (or an SPMU) for controlling the resources of the device 302.

The DPMU control module 304 monitors power, clock, and reset statuses of the device 302. The DPMU control module 304 communicates the statuses to the MPMU 206 (or an SPMU) for controlling power, clock, and reset signals supplied to the device 302. For example, the statuses can be used to adjust power supply voltages and/or clock frequencies that are output to the device 302.

The DPMU control module 304 includes the power management control registers. The DPMU control module 304 includes a clock state table for each clock domain of the device 302 controlled by the DPMU 300. The clock state table stores current clock states (on or off) of each clock of the device 302.

The DPMU control module 304 stores status of each power management component of the device 302. For example only, when the device 302 includes a memory control module, the status may include data related to self-refresh mode and power down mode of the memory control module.

The power module 308, the clock module 310, and the reset module 312 generate and control power, clock, and reset signals for the device 302, respectively. The power, clock, and reset signals are generated and controlled based on the control signals generated by the DPMU control module 304.

The power module 308 controls transitions of power states of the device 302. For example, the power module 308 controls when to turn power supplies to the device 302 on or off based on the device state Dx of the device 302. The power module 308 determines when to turn off power supply to the device 302 based on control signals generated by the MPMU 206. The MPMU 206 makes the final decision regarding removal of power from the device 302 depending on whether the device 302 is needed by one or more of the other devices for their operation.

The clock module 310 controls clock gating of the clocks supplied to the device 302. The clock module 310 may control frequency changes of the clocks supplied to the device 302 using clock multiplexers and/or clock dividers/multipliers. The clock module 310 may determine when to turn clocks on or off based on the device state Dx of the device 302.

The clock module 310 determines when to turn off clocks to the device 302 based on control signals generated by the MPMU 206. The MPMU 206 makes the final decision regarding removal of clocks from the device 302 depending on whether the device 302 is needed by one or more of the other devices for their operation.

The reset module 312 generates reset signals for the device 302. The reset module 312 generates reset signals for the clock domains of the device 302. The reset module 312 generates the reset signals based on the control signals generated by the MPMU 206.

Before describing the PHI and associated signals in detail, an overview of power states of devices (Dx) and power states of the SOC 200 (Sx) is presented. Power states of a device (e.g., the device 302) include D0, D1, D2, D3, and D4. The device is active and fully functional in the power state D0. Conversely, power supplies and clocks are removed from the device (i.e., gated) in the power state D4.

Typically, fabrics include buses that interconnect two or more devices or that interconnect devices and subsystems. Additionally, fabrics include target agents (TAs) and initiating agents (IAs). A target agent may couple a slave device to a fabric. An initiating agent may couple a master device to the fabric. Further, the fabrics may include channels that interconnect the target agents and the initiating agents, multiplexers, switches, routers, and so on. Therefore, fabrics can be considered equivalent to devices. Accordingly, like devices, fabrics may also include DPMUs and may have power states D0 through D4.

The power states D1-D3 are optional. The power state D1 may be a device-specific low-power state. For example, when the device is a memory control module, the power state D1 of the memory control module may be a self-refresh state.

The power state D2 is defined for devices having power saving feature. When the device is in the power state D2, the DPMU of the device is operational. The power management control registers of the DPMU and other registers needed for resuming operation in the power state D0 are accessible via a register fabric described below. The device may retain critical states when the device is in the power state D2. When a fabric local to the device is in the power state D0, devices attached to the fabric automatically enter the power state D2. When the device is in the power state D2, the DPMU of the device may operate using the power supply and clock (or its derivative) of the fabric that connects the DPMU of the device to the MPMU.

When the device is in the power state D3, power to the device is turned off except for retaining critical states. Additionally, clocks are removed from the device except a low-frequency clock may be supplied to retain a self-wakeup timer. The power management control registers of the DPMU and other registers are not accessible when the device is in the power state D3.

Power states of the SOC 200 include S0, S1, S2, S3, and S4. The SOC 200 is functional and in the active mode in the power state S0. Processors of the SOC 200 (e.g., the CPU core 202) can be in any of the processor power states C0, C1, C2, and C3. Processor context is maintained, and instructions are executed. Memory context is maintained and read/write operations are preformed. Devices can be in any of the device power states D0, D1, D2, D3, and D4.

The SOC 200 is in the power save mode in the power state S1. Processor and memory context are maintained, but instructions are not executed. The power states of the devices depend on available power. The devices are generally in the power state D4. A device may be in a power state other than D4 if a power supply requested by a device for a particular power state is available.

The SOC 200 is in the power save mode in the power state S2. Processor context is not maintained. Memory context is maintained. More devices are in the power state D4 when the SOC 200 is in the power state S2 than when the SOC 200 is in the power state S1. The SOC 200 may return to the active state by flushing cache.

The SOC 200 is in the power save mode in the power state S3. The SOC 200 saves more power in the power state S3 than in the power state S2. When the SOC 200 is in the power state S4, the devices are in the power state D4. The SOC 200 may return to the active state by rebooting.

Figure 6:
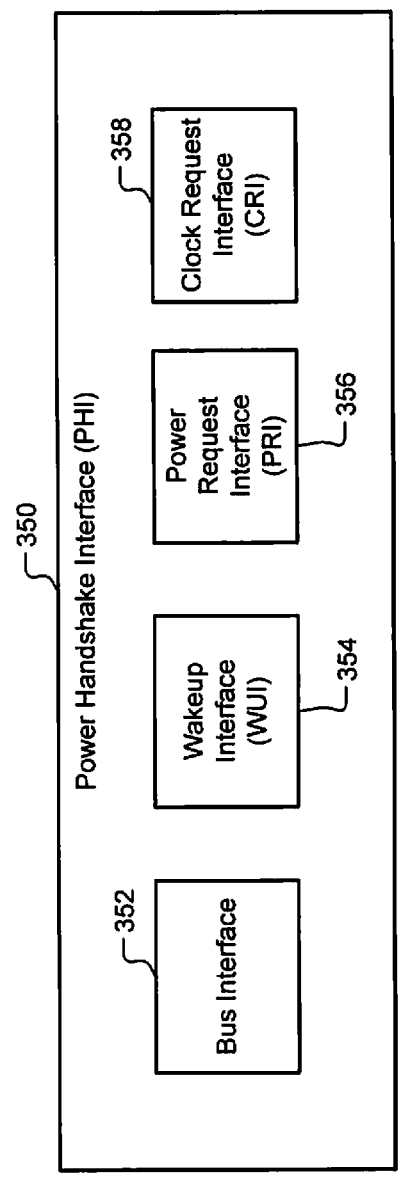
FIG. 6 is a functional block diagram of a power handshake interface (PHI) of the power management architecture.

Referring now to FIG. 6, a PHI 350 includes a bus interface 352, a wakeup interface (WUI) 354, a power request interface (PRI) 356, and a clock request interface (CRI) 358. The bus interface 352 allows the CPU core 202 to access the power management control registers of the MPMU 206. The bus interface 352 is typically (although not essentially) narrower and slower than data fabric of the SOC 200 to reduce power consumed by the PMU bus. Accordingly, components of the MPMU 206 can be powered using high-voltage threshold (HVT) cells to reduce leakage power. The bus interface 352 can also be used to access other registers of the SOC 200. The bus interface 352 can be converted to an advanced peripheral bus (APB) protocol or any standard/proprietary bus protocol.

The wakeup interface 354 communicates wake up requests to and from the MPMU 206. The wake up requests may be initiated by the MPMU 206 and DPMUs. The power state of a DPMU may be at least D2 before the DPMU can generate a wake up request. The wakeup interface 354 is asynchronous and is based on an advanced extensible interface (AXI) low-power interface (LPI) protocol. The AXI LPI protocol is described in the AXI protocol specification v1.0, which is incorporated herein by reference in its entirety.

The SOC 200 may include N of the power request interface 356 when the SOC 200 includes N power supplies for operating devices in the power states D0/D1, where N is an integer greater than or equal to 1. Power supplies for power states D2, D3, and D4 do not have corresponding power request interfaces. A DPMU of a device uses a power request interface to request the MPMU 206 to provide a corresponding power to the device.

The SOC 200 can include one or more (e.g., N) of the clock request interface 358 when the SOC 200 includes N clocks for operating the devices in the power states D0/D1. Clocks for power states D2, D3, and D4 do not have corresponding CRIs. A DPMU of a device uses a CRI to request the MPMU 206 to provide a corresponding clock to the device.

Referring now to FIGS. 7A-7H, signals and handshaking of the PHI 350 are shown. The handshaking is shown using the MPMU 206 and a DPMU as an example. Similar handshaking may occur between the MPMU 206 and an SPMU, and between an SPMU and a DPMU.

Figure 7A:
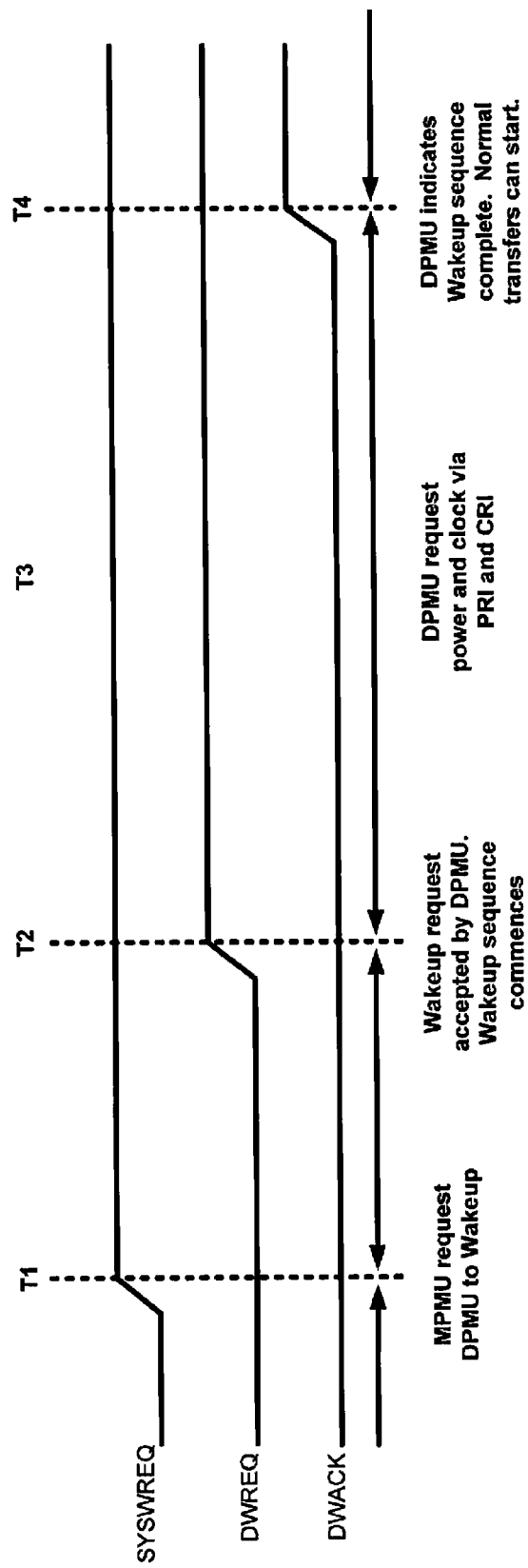
FIGS. 7A-7H are timing diagrams of handshaking signals of the PHI.

In FIG. 7A, the MPMU 206 initiates wake up. The MPMU 206 generates a wake up request to wake up a device (i.e., to transition the power state of the device from D2 to D0) by sending a signal SYSWREQ to a DPMU via the wakeup interface 354. When the DPMU accepts the wake up request, the DPMU acknowledges the wake up request by sending a DWREQ signal to the MPMU 206 via the wakeup interface 354, and a wake up sequence begins. The DPMU requests power and clock from the MPMU 206 via the power request interface 356 and the clock request interface 358, respectively. When the wake up sequence is completed, the DPMU sends a signal DWACK to the MPMU 206 via the wakeup interface 354 to indicate that the wake up sequence is completed.

Figure 7B:
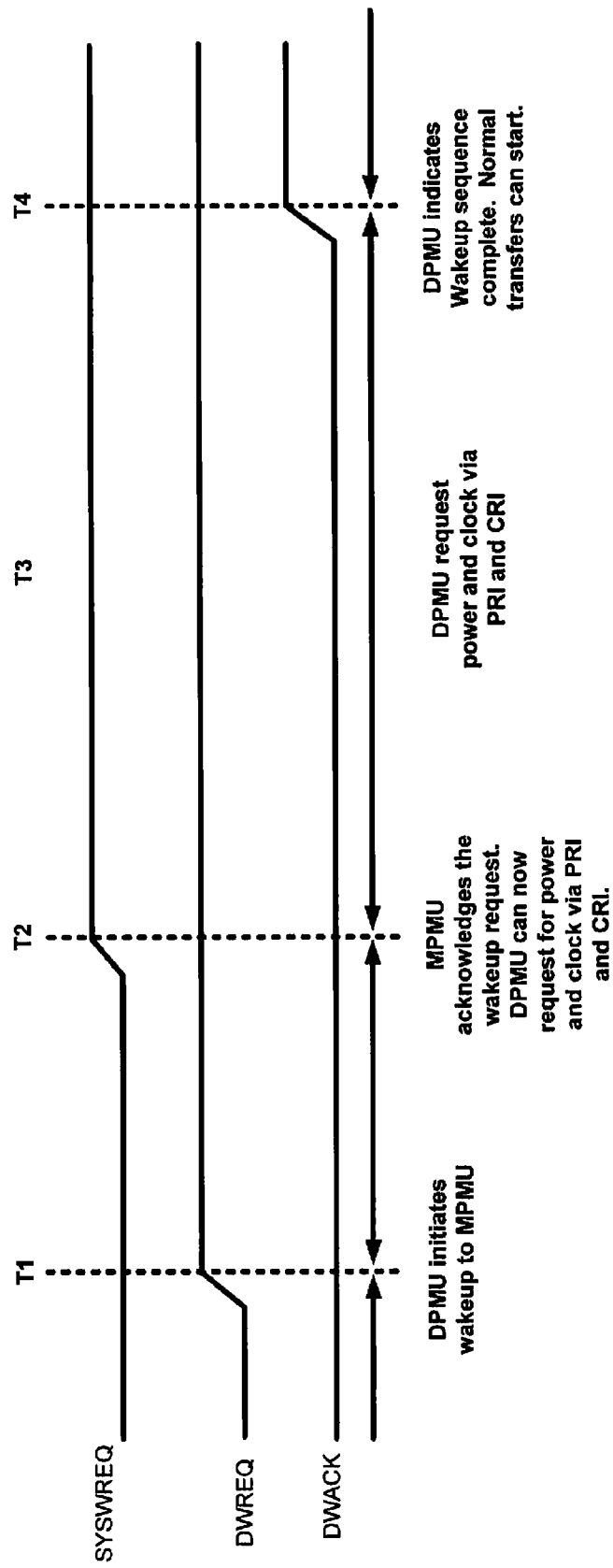

In FIG. 7B, the DPMU initiates wake up. The DPMU generates the wake up request to wake up the device (i.e., to transition the power state of the device from D2 to D0) by sending the signal DWREQ to MPMU 206 via the wakeup interface 354. When the MPMU 206 accepts the wake up request, the MPMU 206 acknowledges the wake up request by sending the SYSWREQ signal to the DPMU via the wakeup interface 354, and a wake up sequence begins. The DPMU requests power and clock from the MPMU 206 via the power request interface 356 and the clock request interface 358, respectively. When the wake up sequence is completed, the DPMU sends the signal DWACK to the MPMU 206 via the wakeup interface 354 to indicate that the wake up sequence is completed.

Figure 7C:
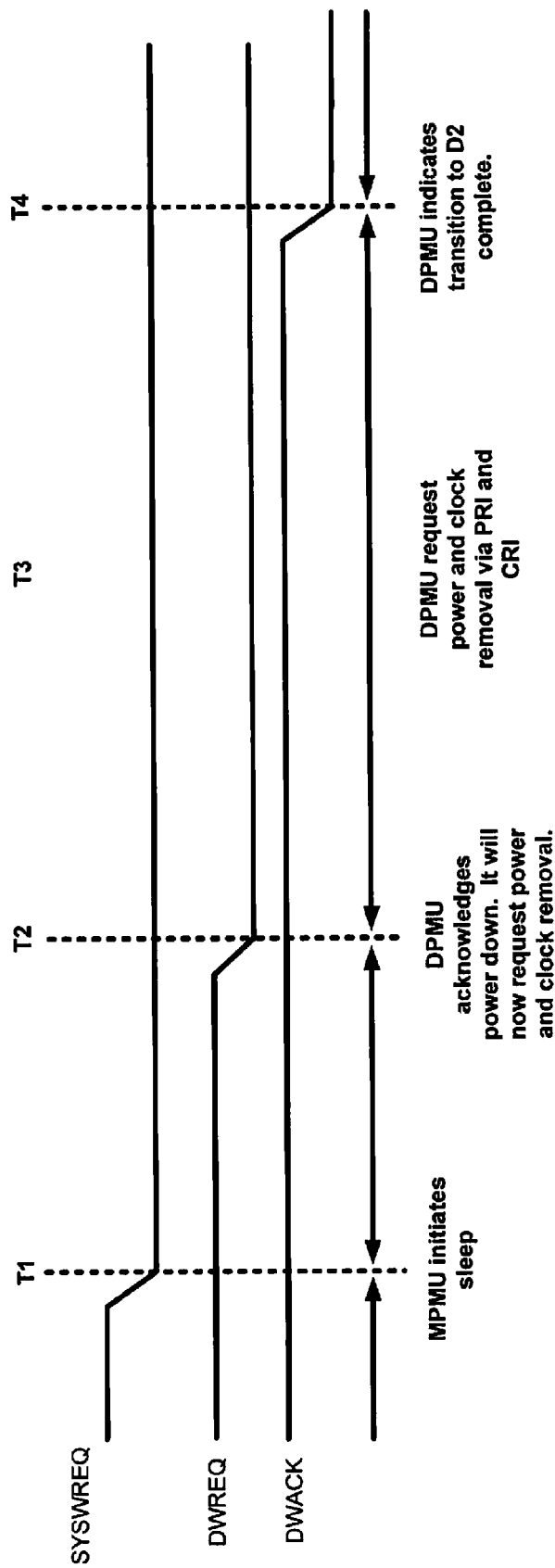

In FIG. 7C, the MPMU 206 initiates sleep mode (i.e., power save mode) for a device. The MPMU 206 generates a sleep request to transition the device to the sleep mode (i.e., to transition the power state of the device from D0 to D2). The MPMU 206 generates the sleep request by sending the signal SYSWREQ to the DPMU via the wakeup interface 354. When the DPMU accepts the sleep request, the DPMU acknowledges the sleep request by sending the DWREQ signal to the MPMU 206 via the wakeup interface 354, and a sleep sequence begins. The DPMU requests the MPMU 206 via the power request interface 356 and the clock request interface 358 to remove power and clock from the device, respectively. When the sleep sequence is completed, the DPMU sends the signal DWACK to the MPMU 206 via the wakeup interface 354 to indicate that the sleep sequence is completed.

Figure 7D:
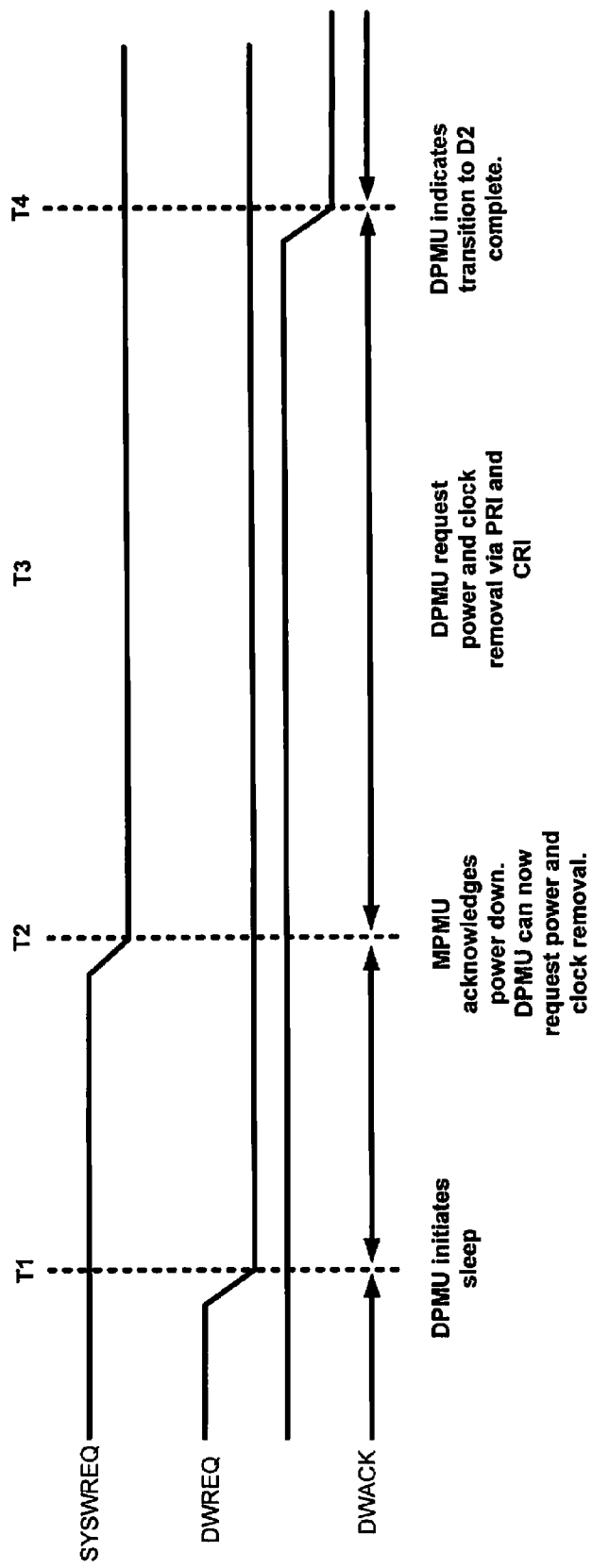

In FIG. 7D, the DPMU of the device initiates the sleep mode. The DPMU generates the sleep request to transition the device to the sleep mode (i.e., to transition the power state of the device from D0 to D2). The DPMU generates the sleep request by sending the signal DWREQ to MPMU 206 via the wakeup interface 354. When the MPMU 206 accepts the sleep request, the MPMU 206 acknowledges the sleep request by sending the SYSWREQ signal to the DPMU via the wakeup interface 354, and the sleep sequence begins. The DPMU requests the MPMU 206 via the power request interface 356 and the clock request interface 358 to remove power and clock from the device, respectively. When the sleep sequence is completed, the DPMU sends the signal DWACK to the MPMU 206 via the wakeup interface 354 to indicate that the sleep sequence is completed. Note that the MPMU makes the final decision regarding granting the sleep request depending on whether the DPMU is needed by one or more of the other DPMUs for their operation.

The device, however, may be configured to be powered down via a power management control register. When the device is so configured, edges of the signals (e.g., falling edges) used to trigger the sleep sequence are disregarded by the MPMU 206 and the DPMU.

Figure 7E:
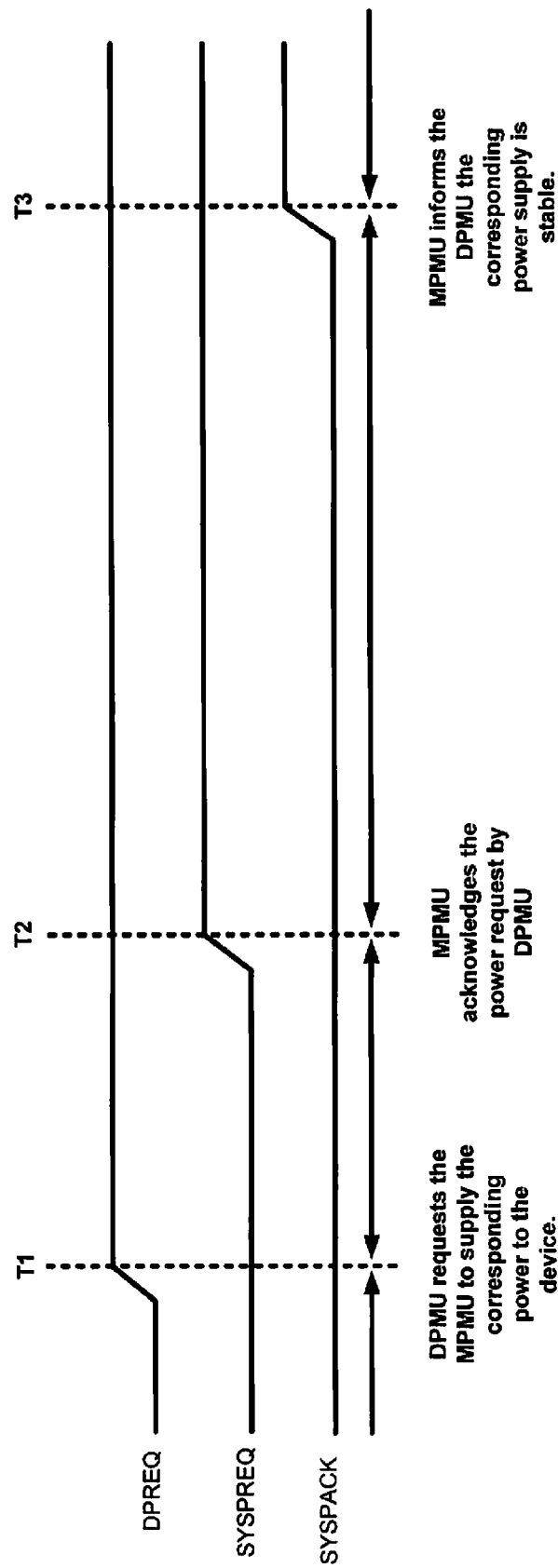

In FIG. 7E, the DPMU requests the MPMU 206 via the power request interface 356 to supply a corresponding power to the device. The DPMU generates a power request to supply the corresponding power to the device by sending a signal DPREQ to MPMU 206 via the power request interface 356. When the MPMU 206 accepts the power request, the MPMU 206 acknowledges the power request by sending a SYSPREQ signal to the DPMU via the power request interface 356. A rising edge of the SYSPREQ signal indicates to the DPMU that the MPMU 206 acknowledged the power request. The MPMU 206 sends a signal SYSPACK to the DPMU via the power request interface 356 to indicate that the requested power is stable and is supplied to the device.

The MPMU 206 also uses the power request interface 356 to inform the DPMU that the corresponding power supply will be shut down. A falling edge of the SYSPREQ signal indicates to the DPMU that the MPMU 206 will shut down the corresponding power supply.

Figure 7F:
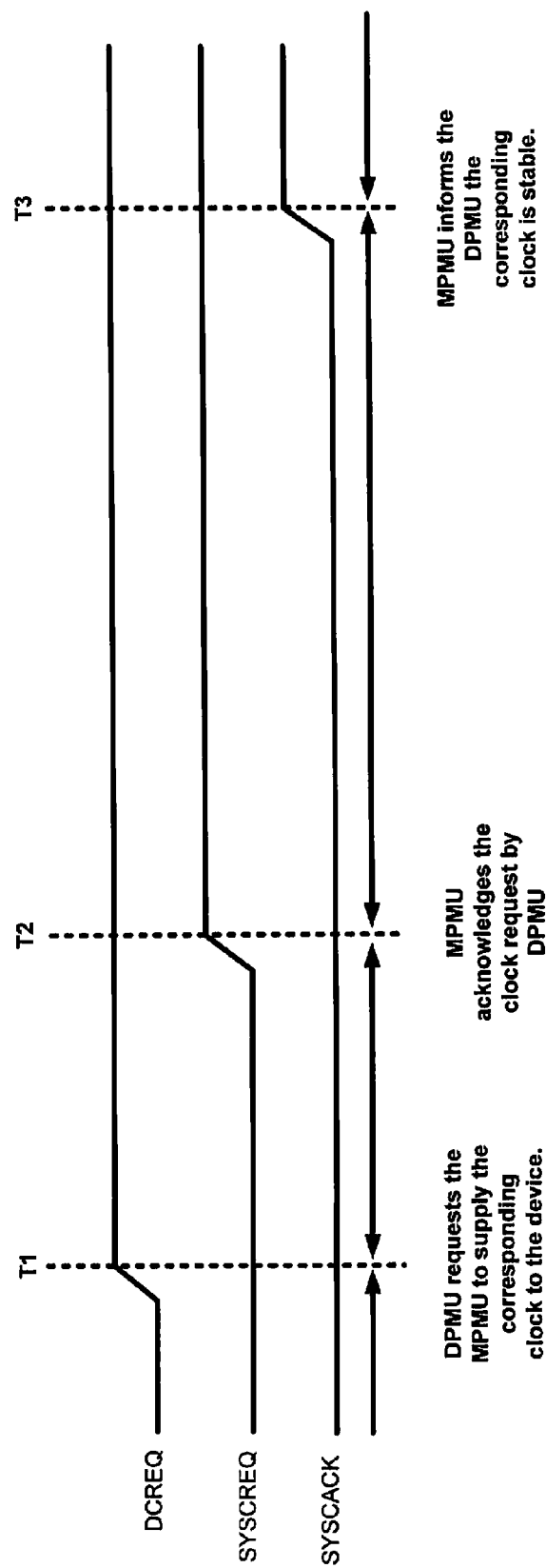

In FIG. 7F, the DPMU requests the MPMU 206 via the clock request interface 358 to supply a corresponding clock to the device. The DPMU generates a clock request to supply the corresponding clock to the device by sending a signal DCREQ to MPMU 206 via the clock request interface 358. When the MPMU 206 accepts the clock request, the MPMU 206 acknowledges the clock request by sending a SYSCREQ signal to the DPMU via the clock request interface 358. A rising edge of the SYSCREQ signal indicates to the DPMU that the MPMU 206 acknowledged the clock request. The MPMU 206 sends a signal SYSCACK to the DPMU via the clock request interface 358 to indicate that the requested clock is stable and is supplied to the device.

The MPMU 206 also uses the clock request interface 358 to inform the DPMU that the corresponding clock will be removed. A falling edge of the SYSCREQ signal indicates to the DPMU that the MPMU 206 will remove the corresponding clock.

Figure 7G:
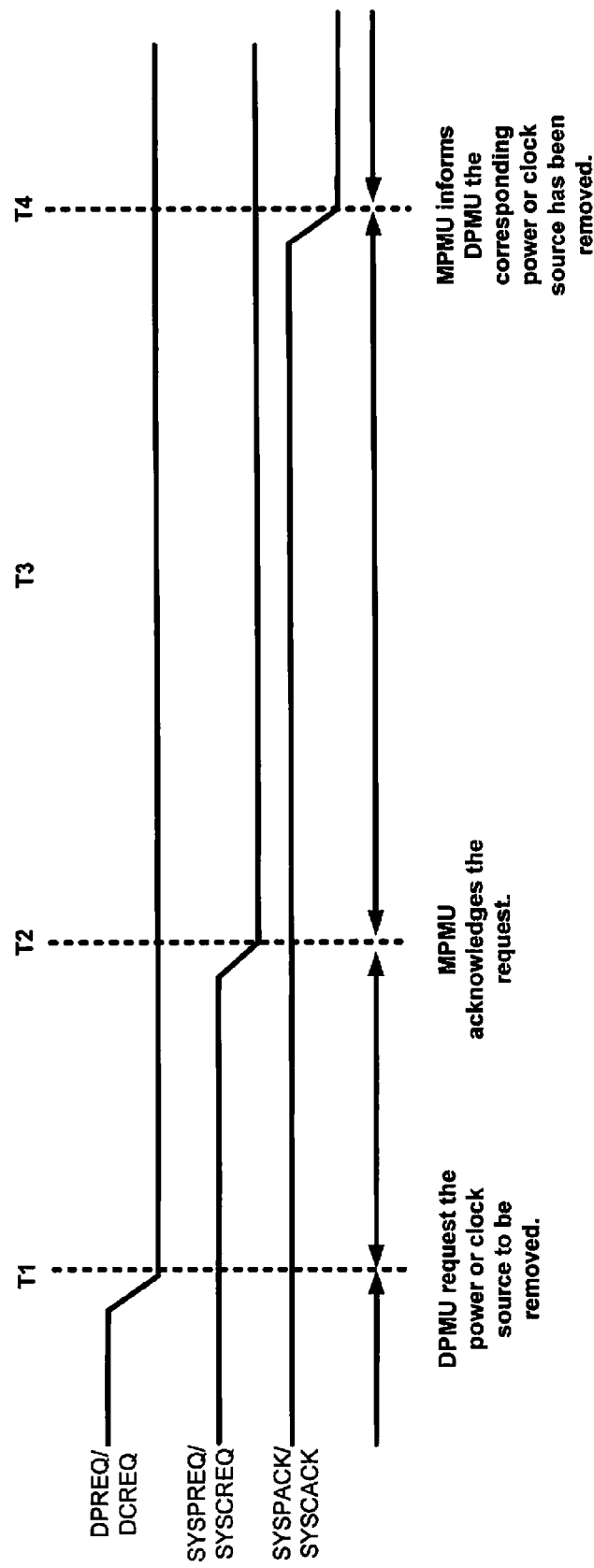

In FIG. 7G, the DPMU can use the PRI 356/CRI 358 to request the MPMU 206 to remove power/clock from the device. The DPMU requests that the power/clock be removed from the device by sending the DPREQ/DCREQ signals to the MPMU 206 via the PRI 356/CRI 358. The MPMU 206 acknowledges the request by sending the SYSPREQ/SYSCREQ signals to the DPMU via the PRI 356/CRI 358. The MPMU 206 informs the DPMU that the power/clock has been removed by sending the SYSPACK/SYSCACK signals to the DPMU via the PRI 356/CRI 358. Note that the MPMU makes the final decision regarding removal of power/clock from a DPMU depending on whether the DPMU is needed by one or more of the other DPMUs for their operation.

Figure 7H:
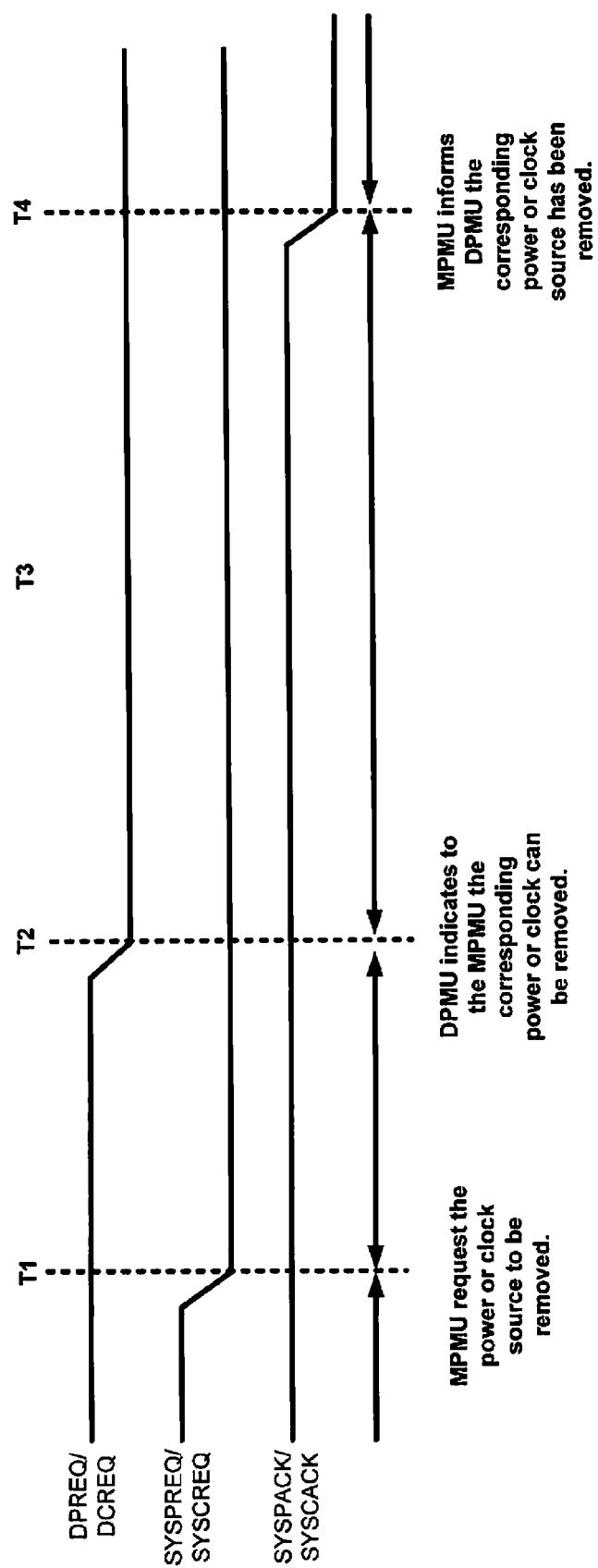

In FIG. 7H, the MPMU 206 can use the PRI 356/CRI 358 to request the DPMU to remove power/clock from the device. The MPMU 206 requests that the power/clock be removed from the device by sending the SYSPREQ/SYSCREQ signals to the DPMU via the PRI 356/CRI 358. The DPMU acknowledges the request by sending the DPREQ/DCREQ signals to the MPMU 206 via the PRI 356/CRI 358. By sending the DPREQ/DCREQ signals, the DPMU informs the MPMU 206 that the requested power/clock can be removed from the device. The MPMU 206 informs the DPMU that the power/clock has been removed by sending the SYSPACK/SYSCACK signals to the DPMU via the PRI 356/CRI 358.

The device, however, may be configured to be powered down via the power management control register. When the device is so configured, edges of the signals (e.g., falling edges) used to trigger the sleep sequence are disregarded by the MPMU 206 and the DPMU.

Alternatively, the power, clock, and reset resources of DPMUs may be controlled using the power management control registers of the DPMUs. The power management control registers effectively shadow the wakeup interface 354, the power request interface 356, and the clock request interface 358. The sequences shown in FIGS. 7A-7H can be executed by accessing the power management control registers. The power management control registers provide compatibility with the software controls of the software-centric PMUs.

The power management control registers can include a control register, wakeup interface registers, power request interface registers, and clock request interface registers. The control register may include fields to control a source and a method of operation of wakeup interface, power request interface, and clock request interface. The source indicates whether a power state transition is initiated by the MPMU 206 or the DPMU. The method of operation indicates whether the handshaking for the transition is performed via the wakeup interface 354, the power request interface 356, and the clock request interface 358 or by accessing the registers of the DPMU.

For example only, the field that controls the source and the method of wakeup interface may be as follows. Source bits: 11=MPMU/DPMU can both initiate wake up. 10=Only MPMU can initiate wake up. 01=Only DPMU can initiate wake up. 00=Reserved. Method bit: 0=wake up initiated by MPMU using the wakeup interface. 1=wake up initiated by MPMU using registers of the wakeup interface.

The registers of the wakeup interface are referred to herein as SYSWREQ, DWREQ, and DWACK. The registers of the power request interface are referred to herein as DPREQ, SYSPREQ, and SYSPACK. The registers of the clock request interface are referred to herein as DCREQ, SYSCREQ, and SYSCACK. Each bit of the DPREQ register may correspond to a different power supply. Each bit of the DCREQ register may correspond to a different clock.

Additionally, the DPMUs may include other registers that indicate device clock status. The other registers may be used to control the clock of the device. For example, the other registers may be used to select clock multiplexers and to input values for clock multipliers/dividers. The other registers may be used to control entry/exit of power modes. An OS power manager (OSPM) may provide criteria to initiate power down and wake up of the device.

Accordingly, there are three ways of interfacing with the DPMUs. First, the MPMU interfaces with the DPMU using the physical wakeup interface, power request interface, and clock request interface. The MPMU controls the DPMU by handshaking via the physical wakeup interface, power request interface, and clock request interface. For example, the MPMU controls the DPMU by toggling pins of the wakeup interface, power request interface, and clock request interface. Second, the MPMU interfaces with the DPMU via system registers. The OSPM may use the system registers to manage power consumption of the DPMU in conjunction with the MPMU. The MPMU controls the DPMU by reading/writing to the power management control registers of the DPMU via the system registers. Third, the MPMU interfaces with the DPMU via a PMU fabric. The MPMU controls the DPMU by reading/writing directly to the power management control registers via the PMU fabric.

Referring now to FIGS. 8A-8C, the three ways of interfacing with the DPMUs are shown. In FIG. 8A, an SOC 400-1 includes a CPU core 402, an MPMU 404, and a device (e.g., a core) 406 that is controlled by a DPMU 408. The CPU core 402, the MPMU 404, and the DPMU 408 communicate via a PMU fabric 410. The core 406 communicates with the rest of the components of the SOC 400-1 via a data fabric 412. The MPMU 404 uses the physical wakeup interface, power request interface, and clock request interface to interface with the DPMU 408. The MPMU 404 controls the DPMU 408 by handshaking via the physical wakeup interface, power request interface, and clock request interface. For example, the MPMU 404 controls the DPMU 408 by toggling pins of the physical wakeup interface, power request interface, and clock request interface.

In FIG. 8B, an SOC 400-2 includes elements of the SOC 400-1 and system registers 414. The OSPM may use the system registers 414 to manage power consumption of the DPMU 408 in conjunction with the MPMU 404. The CPU core 402 interfaces with the DPMU 408 via system registers 414. The system registers 414 interface with the DPMU 408 via the physical wakeup interface, power request interface, and clock request interface. The CPU core 402 reads/writes to the power management control registers of the DPMU 408 via the system registers 414 based on data received from the OSPM. Additionally or alternatively, the MPMU 404 may read/write to the power management control registers of the DPMU 408 via the system registers 414.

In FIG. 8C, an SOC 400-3 is shown. The MPMU 404 interfaces with the DPMU 408 via the PMU fabric 410. The MPMU 404 controls the DPMU 408 by directly reading/writing the power management control registers via the PMU fabric 410. The MPMU 404 reads/writes the power management control registers without using the physical wakeup interface, power request interface, and clock request interface and the system registers 414. Alternatively, the MPMU 404 controls the DPMU 408 by directly reading/writing the power management control registers via a dedicated register bus that is different than the PMU bus (PMU fabric) and the system bus (main fabric).

Referring now to FIG. 9, an example of an implementation of the power management architecture in an SOC 450 is shown. The SOC 450 may include a CPU 452, an MPMU 454, and a plurality of DPMUs controlling devices. For example, the DPMUs may include DPMU-A 456-1, DPMU-B 456-2, and DPMU-C 456-3 (collectively DPMUs 456). The devices may include Device A 458-1, Device B, 458-2, and Device C 458-3 (collectively devices 458).

The SOC 450 may include a main fabric 460. The main fabric 460 is the main data/address/control bus of the SOC 450. The devices 458 communicate with the CPU 452 via the main fabric 460. The main fabric 460 may include a DPMU-MF 462.

The MPMU 454 may communicate with the DPMUs 456 and the DPMU-MF 462 via a PMU_APB bus 464. The MPMU 454 may also communicate with the DPMUs 456 and the DPMU-MF 462 via the wakeup interface, power request interface, and clock request interface. The CPU 452 and the MPMU 454 may access the power management control registers of the DPMUs 456 and the DPMU-MF 462 via a dedicated register fabric 466.

The register fabric 466 is narrower and slower than the main fabric 460. Since the register fabric 466 can run at a lower speed than the main fabric 460, HVT cells can be used to power the register fabric 466. Thus, the register fabric may be powered on most of the time.

Accordingly, the CPU 452, the MPMU 454, the DPMUs 458, and/or the DPMU-MF 462 can perform power management functions using the register fabric 466 most of the time while conserving power. The CPU 452 and/or the MPMU 454 may access the power management control registers of the DPMUs 458 and/or the DPMU-MF 462 via the register fabric 466. Additionally, the register fabric 466 can employ dynamic clock gating at root level to further reduce power consumption of the SOC 450. Further, the register fabric 466 can employ dynamic clock gating to individual flip-flops, groups of flip-flops, and/or modules up to the root level.

Referring now to FIG. 10, power-aware fabric components of an SOC 500 are shown. The SOC 500 may include an MPMU 502, a main fabric 504, and a plurality of master and slave devices. The master devices may include a Master 0 (e.g., a core 1) 506-1, a Master 1 (e.g., another fabric) 506-2, and a Master 2 (e.g., a core 2) 506-3 (collectively masters 506). The slave devices may include a Slave 0 508-1 and a Slave 1 508-2 (collectively slaves 508).

The main fabric 504 may include a DPMU 512. The MPMU 502 and the DPMU 512 may communicate via a power management fabric (PMU fabric). The slaves 508 may include a DPMU 514-1 and a DPMU 514-2, respectively (collectively DPMUs 514). The main fabric 504 may include a target agent (TA) 516 for the Slave 0 508-1. The SOC 500 may further include wakeup controllers 518-1 and 518-2 (collectively wakeup controllers 518).

Although not shown, the main fabric 504 may include a target agent for the Slave 1 508-2. Additionally, the main fabric 504 may include initiating agents (IAs) for coupling the wakeup controllers 518 and the Master 2 506-3 to the main fabric 504, channels that interconnect the TAs and the IAs, multiplexers, switches, and so on.

Each of the wakeup controllers 518 is a bridge between one of the masters 506 and one of the slaves 508. The wakeup controllers 518 perform wake up functions for a core or a fabric (e.g., for the Master 0 506-1 and the Master 1 506-2). When a master attempts to access a slave, the bridge between the master and the slave can interact with the MPMU 502. The bridge can send a wake up request to the MPMU 502 to wake up the slave. The wakeup controllers 518 and the MPMU 502 may communicate using the wakeup interface.

The MPMU 502 may choose to wake up a target domain comprising the slave. The bridge will backpressure until the slave is ready. Alternatively, the MPMU 502 may choose not to wake up the target domain. The bridge will return error responses to each attempted transaction. Thus, the bridge prevents timeouts and prevents systems from hanging. The bridge is particularly helpful when using a chip debugger if some domains of a chip being debugged are powered down. Additionally, the bridge can control isolation cells using on-chip protocol (OCP) signals without needing latches. Isolation cells isolate power gated devices from devices that are powered on.

Target agents can generate wake up events (interrupts to the MPMU 502) for slaves that are directly attached to the target agents. For example, the TA 516 can generate wake up events for the Slave 0 508-1. The TA 516 can send an interrupt to the MPMU 502 when the Slave 0 508-1 needs to wake up or shut down. The MPMU 502 processes the interrupt and grants the wake up and shutdown request. The MPMU 502 may track outstanding transactions and determine whether to grant a shutdown request of the slave. The request to shut down may be denied if the slave is needed to complete the outstanding transactions.

Figure 11A:
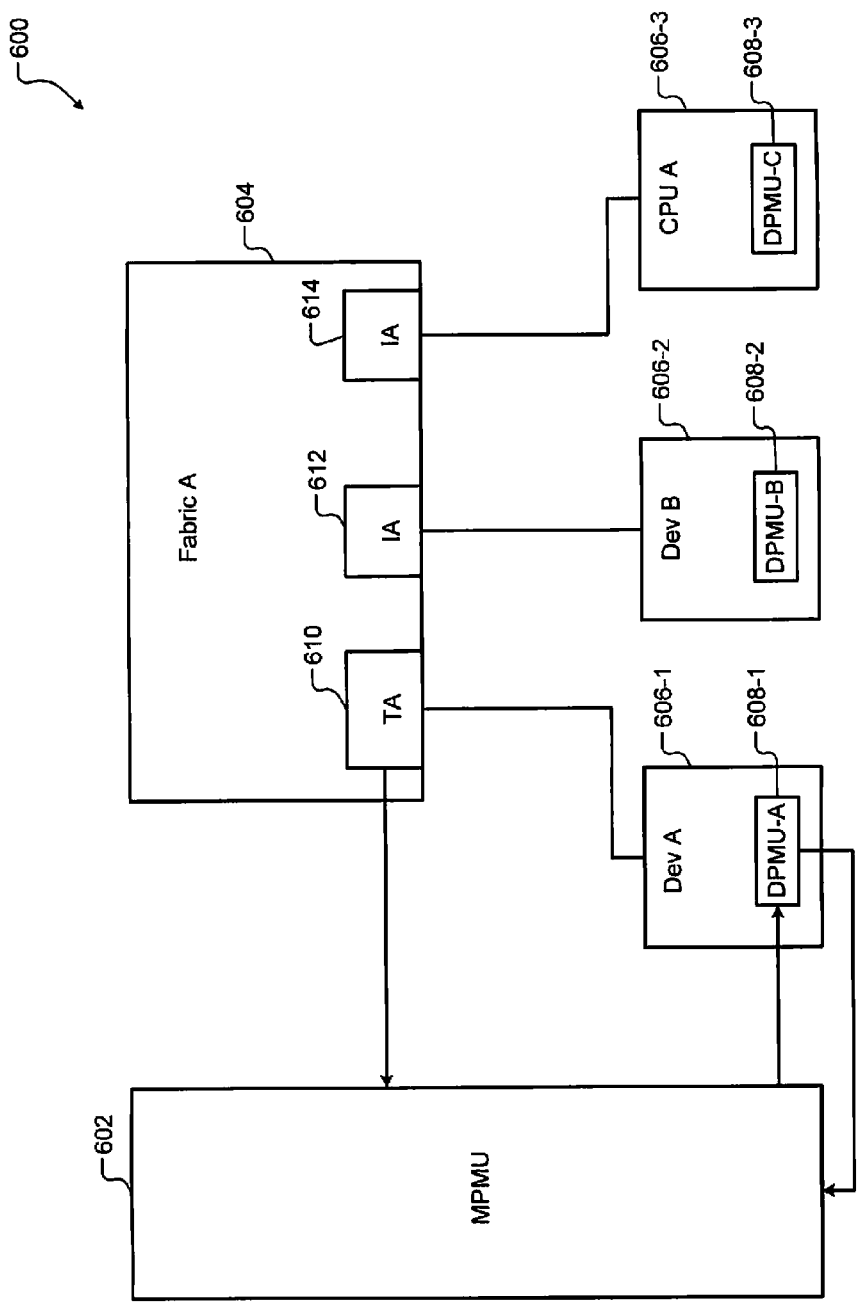
FIGS. 11A-11E are functional block diagrams of an SOC that implements wake up handshaking using the power management architecture.
Figure 11B:
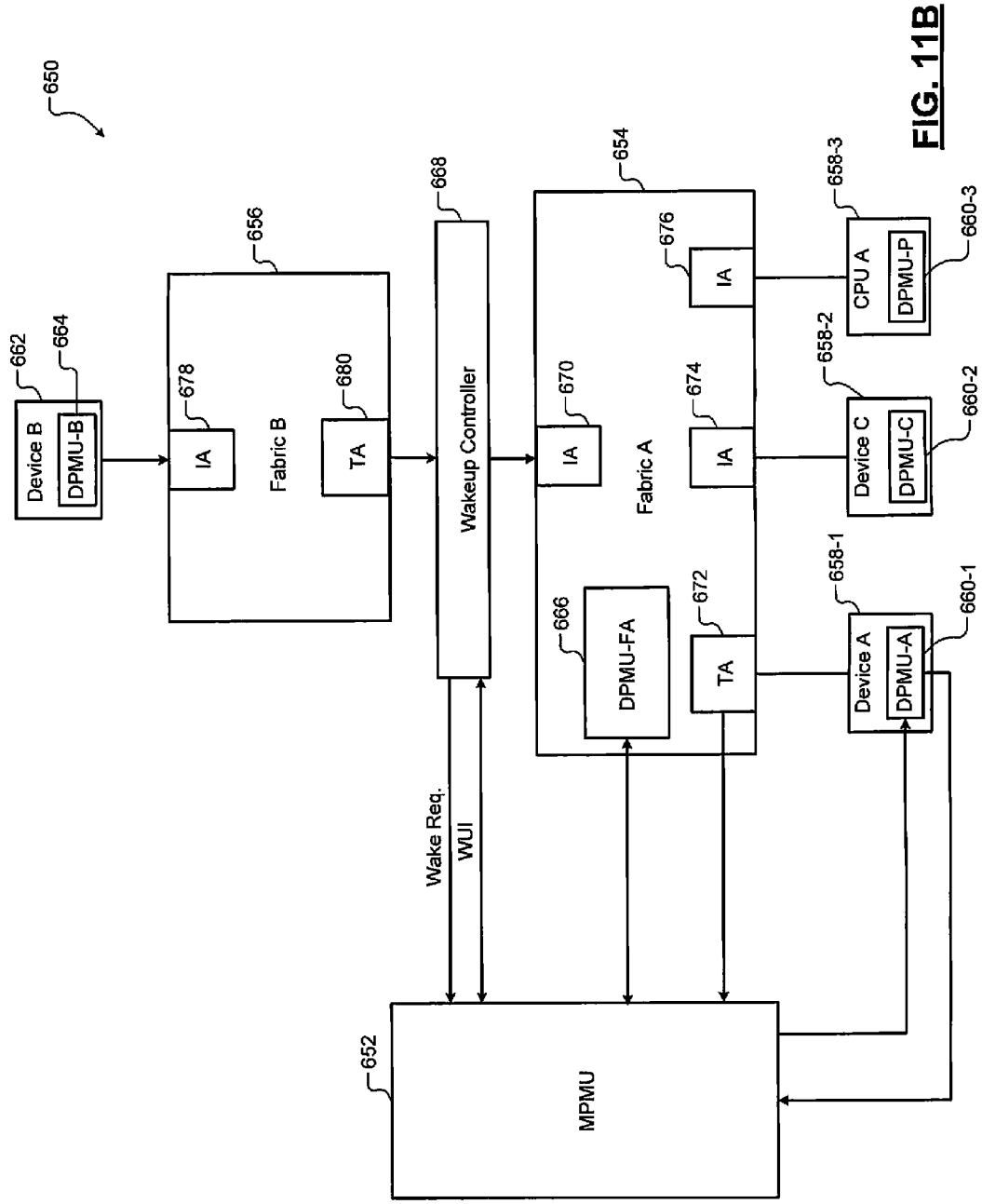
Figure 11C:
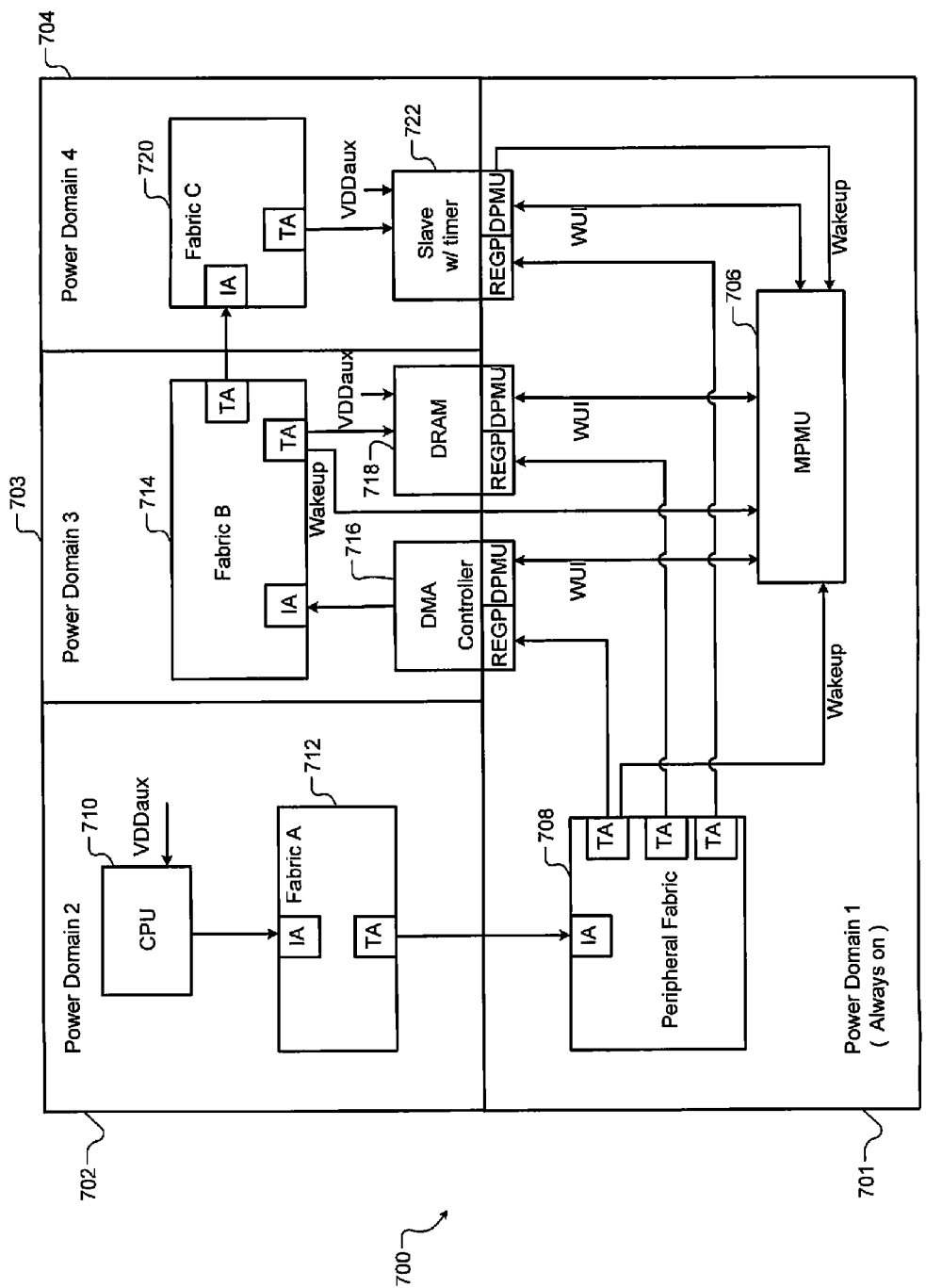
Figure 11D:
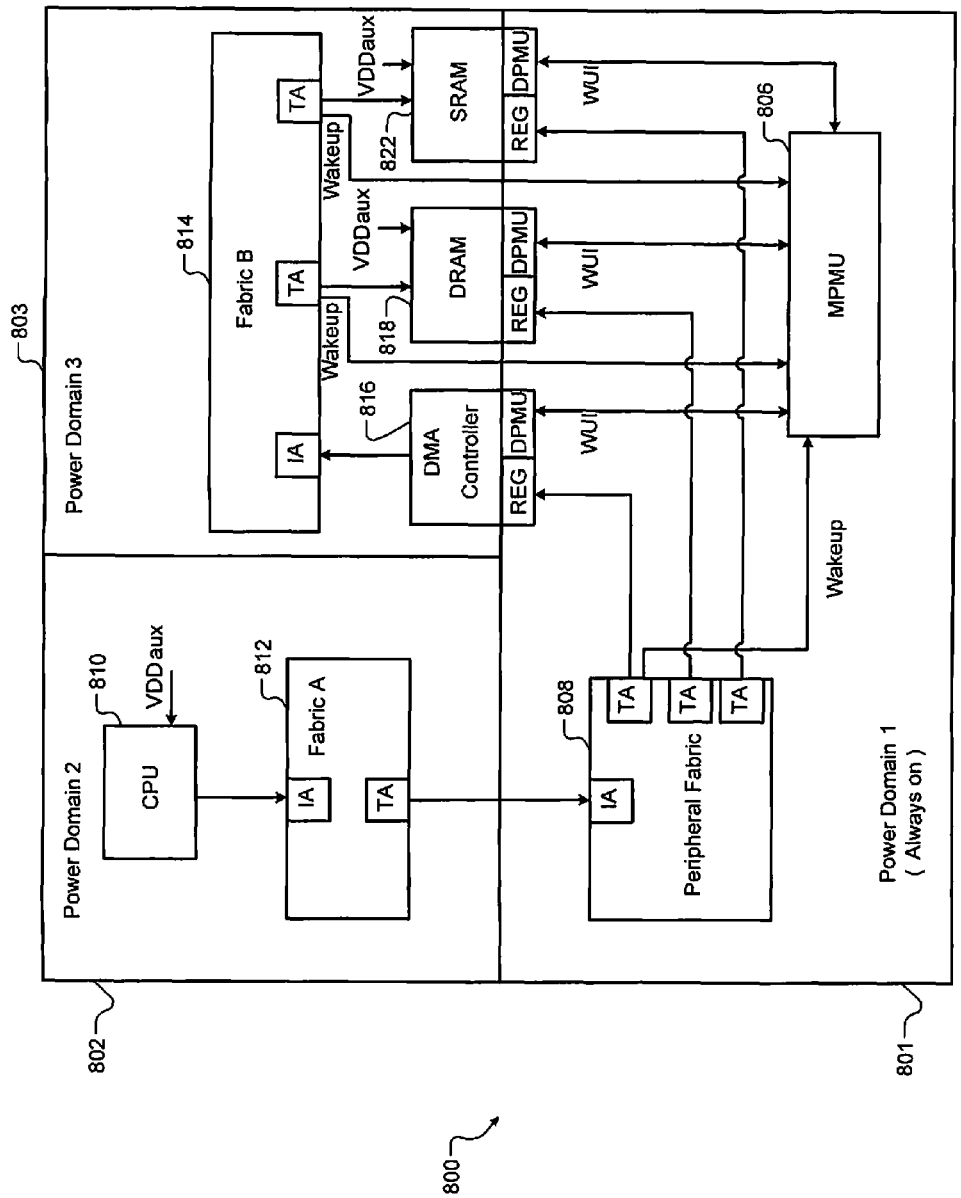
Figure 11E:
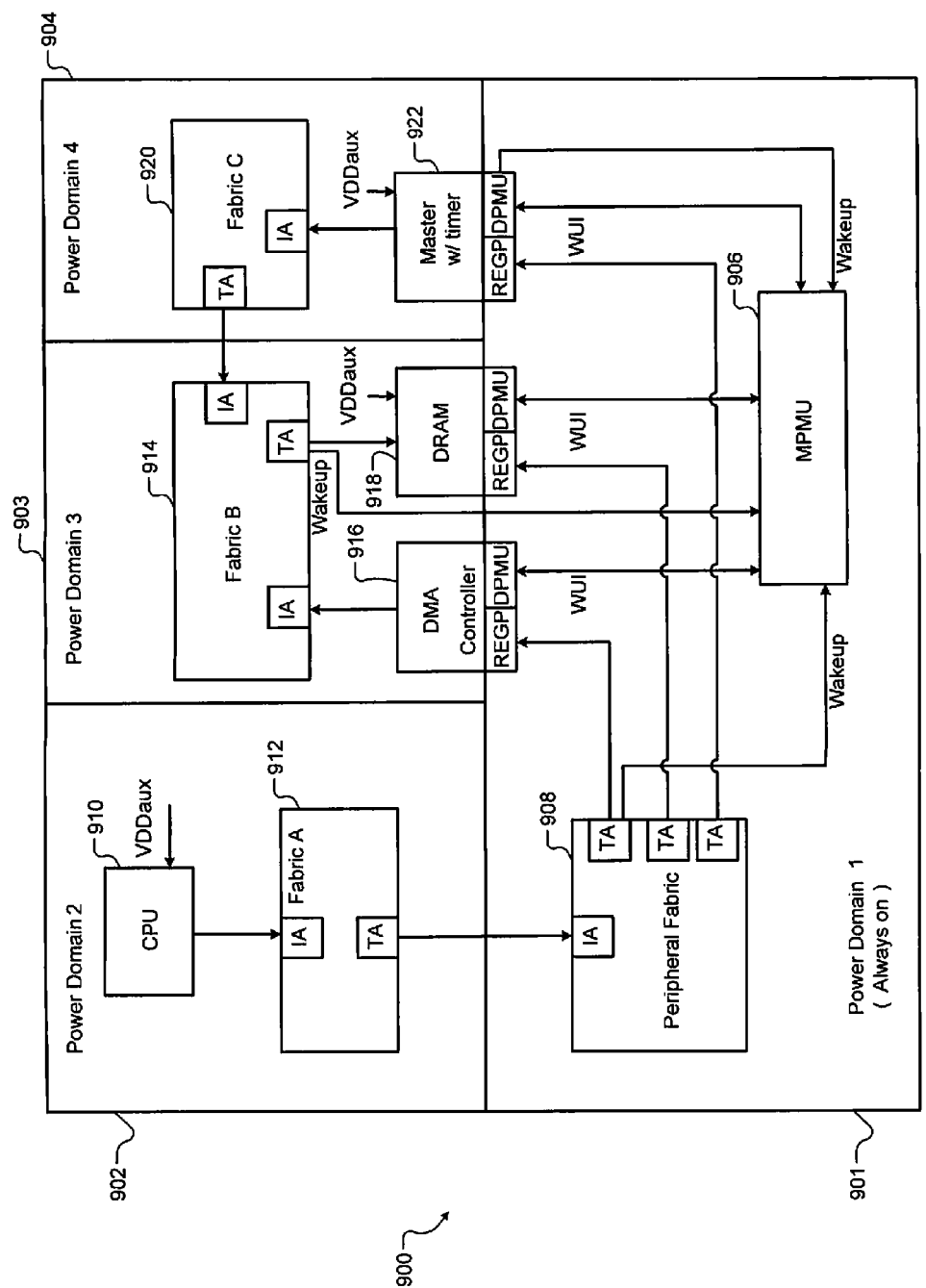

Referring now to FIGS. 11A-11E, examples of wake up handshaking using the PMU architecture are shown. In FIG. 11A, wake up handshaking for a single fabric domain is shown. In FIG. 11B, wake up handshaking for multiple fabric domains is shown. In FIG. 11C, wake up handshaking when a slave includes a wakeup timer and when CPU is awake is shown. In FIG. 11D, wake up handshaking initiated by the CPU when the CPU is awake is shown. In FIG. 11E, wake up handshaking initiated without CPU intervention by a master that includes a wakeup timer is shown. Additional examples of wake up handshaking using the PMU architecture are contemplated.

In FIG. 11A, an SOC 600 may include an MPMU 602, a fabric A 604, and Device A 606-1, Device B 606-2, and CPU-A 606-6 (collectively devices 606). The devices 606 may include DPMU-A 608-1, DPMU-B 608-2, DPMU-C 608-3 (DPMUs 608), respectively. The fabric A 604 may include a TA 610, an initiating agent (IA) 612, and an IA 64 that communicate with the devices 606, respectively.

Initially, the power states of Device A 606-1, Device B 606-2, fabric A 604, and CPU-A 606-3 may be D2, D0, D0, and C1, respectively. Device B 606-2 may initiate a transaction (e.g., data transfer) with Device A 606-1. TA 610 connected to Device A 606-1 interrupts the MPMU 602 requesting the MPMU 602 to wake up Device A 606-1.

MPMU 602 requests DPMU-A 608-1 to wake up Device A by sending a SYSWREQ signal via the wakeup interface. For example, the MPMU 602 may toggle a SYSWREQ pin of the wakeup interface that connects the MPMU 602 to the DPMU-A 608-1. Alternatively, the MPMU 602 may toggle a SYSWREQ bit in the power management control register of the DPMU-A 608-1.

The DPMU-A 608-1 may respond by asserting the DWREQ signal. The DPMU-A 608-1 may handshake with the MPMU 602 to supply the power and clock to Device A 606-1 in a desired sequence by toggling the PRI and CRI pins/register bits in proper order. After Device A 606-1 receives the power and clock from the MPMU 602, the DPMU-A 608-1 may indicate to the MPMU 602 when Device A 606-1 has completed transition from power state D2 to D0 by asserting the DWACK signal. Subsequently, Device B 606-2 may complete the transaction with Device A 606-1.

In FIG. 11B, an SOC 650 may include an MPMU 652, a fabric A 654, and a fabric B 656. The SOC 650 may include Device A 658-1, Device C 658-2, and CPU A 658-3 (collectively devices 658) that communicate via fabric A 654. The devices 658 may include DPMU-A 660-1, DPMU-C 660-2, and DPMU-P 660-3 (collectively DPMUs 660), respectively.

The SOC 650 may include Device B 662 that communicates with fabric B 656. Device B 662 may include DPMU-B 664. Fabric A 654 may include DPMU-FA 666.

The SOC 650 may include a wakeup controller 668 that is a bridge between fabric A 654 and fabric B 656. The wakeup controller 668 communicates with fabric A 654 via an IA 670. Fabric A includes a TA 672, an IA 674, and an IA 676 that communicate with devices 658, respectively. Fabric B 656 includes an IA 678 that communicates with Device B 662. Fabric B 656 includes a TA 680 that communicates with the wakeup controller 668.

Initially, the power state of fabric B 656 and Device B 662 may be D0. The power state of fabric A 654 and devices 658 may be D3 or D4. Device B 662 may initiate a transaction with Device A 658-1 by sending a transfer request to the wakeup controller 668. The wakeup controller 668 sends a wake up request to the MPMU 652 to wake up fabric A 654. The MPMU 652 supplies the power and clock to fabric A 654. For example, the power and clock supplied by the MPMU 652 may transition fabric A 654 from power state D3 to power state D2.

The MPMU 652 then sends a wake up request to DPMU-FA 666 of fabric A 654 via a wakeup interface. DPMU-FA 666 handshakes with the MPMU 652 to transition fabric A from power state D2 to D0 by toggling PRI and CRI in proper order. After fabric A 654 has transitioned to power state D0, DPMU-FA 666 asserts the DWACK signal to indicate to the MPMU 652 that fabric A 654 is in power state D0.

The MPMU 652 indicates to the wakeup controller 668 that fabric A is powered up. The wakeup controller 668 then outputs the transfer request received from Device B 662 to fabric A 654. When fabric A 654 receives the transfer request, TA 672 attaches to Device A 658-1 and interrupts the MPMU 652 to wake up Device A 658-1. The remaining procedure is explained in the description of FIG. 11A.

In FIG. 11C, an SOC 700 includes first, second, third, and fourth power domains 701, 702, 703, and 704, respectively. The first power domain 701 may include an MPMU 706 and a peripheral fabric 708. The peripheral fabric 708 may communicate with processors and peripheral devices in the second, third, and fourth power domains 702, 703, and 704.

The second power domain 702 includes a CPU 710 and a fabric A 712. The CPU 710 communicates with the peripheral devices via the peripheral fabric 708. The CPU communicates with the peripheral fabric 708 via fabric A 712.

The third power domain 703 includes a fabric B 714 and peripheral devices. The peripheral devices may include a direct memory access (DMA) controller 716 and dynamic random access memory (DRAM) 718. The DMA controller 716 and the DRAM 718 communicate via the fabric B 714.

The fourth power domain 704 includes a fabric C 720 and a slave device having a wakeup timer (slave) 722. The peripheral fabric 708 and the fabrics A, B, and C, 712, 714, and 720 include target agents and initiating agents to communicate with devices connected to the respective fabrics. Each of the peripheral devices may include a DPMU. Although not shown, each of the CPU 710, the peripheral fabric 708, and the fabrics A, B, and C, 712, 714, and 720 may also include a DPMU. An auxiliary power supply (VDDaux) may be supplied to the CPU 710, the DRAM 718, and the slave 722 to maintain context in low-power modes.

Initially, the CPU 710 is in the active state, and the power state of the DMA controller 716, the DRAM 718, and the slave 722 is D2. The DMA controller 716 transfers data from the slave 722 to the DRAM 718 as follows.

The wakeup timer in the slave 722 triggers wake up. The slave 722 transitions from power state D2 to power state D0 and interrupts the CPU 710. The CPU 710 requests the MPMU 706 to wake up the DMA controller 716, the DRAM 718, fabric B 714, and fabric C 720. The MPMU 706 transitions the power state of the DMA controller 716, the DRAM 718, fabric B 714, and fabric C 720 from D2 to D0.

The CPU 710 programs the DMA controller 716 to transfer data from the slave 722 to the DRAM 718. After the data is transferred, the slave 722 initiates wakeup interface handshake and returns to the power state D2. The CPU 710 requests the MPMU 706 to transition the power state of the DMA controller 716, the DRAM 718, fabric B 714, and fabric C 720 from D0 to D2. The MPMU 706 transitions the power state of the DMA controller 716, the DRAM 718, fabric B 714, and fabric C 720 from D0 to D2.

In FIG. 11D, an SOC 800 includes first, second, and third domains 801, 802, 803, respectively. The first power domain 801 may include an MPMU 806 and a peripheral fabric 808. The peripheral fabric 808 may communicate with processors and peripheral devices in the second and third power domains 802, 803.

The second power domain 802 includes a CPU 810 and a fabric A 812. The CPU 810 communicates with the peripheral devices via the peripheral fabric 808. The CPU communicates with the peripheral fabric 808 via fabric A 812.

The third power domain 803 includes a fabric B 814 and peripheral devices. The peripheral devices may include a DMA controller 816, DRAM 818, and static RAM (SRAM) 822. The DMA controller 816, the DRAM 818, and the SRAM 822 communicate via the fabric B 814.

The peripheral fabric 808 and the fabrics A and B, 812, 814 include target agents and initiating agents to communicate with devices connected to the respective fabrics. Each of the peripheral devices may include a DPMU. Although not shown, each of the CPU 810, the peripheral fabric 808, and the fabrics A and B, 812, 814 may also include a DPMU. An auxiliary power supply (VDDaux) may be supplied to the CPU 810, the DRAM 818, and the SRAM 822 to maintain context in low-power modes.

Initially, the CPU 810 is in the active state, and the power state of the DMA controller 816, the DRAM 818, and the SRAM 822 is D2. The power state of the peripheral fabric 808 and the fabric B 814 is D0. The CPU 810 initiates a DMA transfer as follows.

The CPU 810 issues commands for accessing DMA registers. Consequently, a target agent of peripheral fabric 808 attaches to the DMA controller 816 and triggers a wake up of the DMA controller 816. The power state of the DMA controller 816 transitions from D2 to D0.

The DMA controller 816 issues a read command to read data from the SRAM. Consequently, a target agent of fabric B 814 attaches to the SRAM 822 and triggers a wake up of the SRAM 822. The power state of the SRAM 822 transitions from D2 to D0.

The DMA controller 816 reads data from the SRAM 822 and issues write commands to transfer the data to the DRAM 818. Consequently, a target agent of fabric B 814 attaches to the DRAM 818 and triggers a wake up of the DRAM 818. The power state of the DRAM 818 transitions from D2 to D0.

The DMA controller 816 writes the data read from the SRAM 822 to the DRAM 818. After the data is written to the DRAM 818, the CPU 810 requests the MPMU 806 to transition the DMA controller 816 to the power state D2. The MPMU 806 transitions the power state of the DMA controller 816 D0 to D2.

In FIG. 11E, an SOC 900 includes first, second, third, and fourth power domains 901, 902, 903, and 904, respectively. The first power domain 901 may include an MPMU 906 and a peripheral fabric 908. The peripheral fabric 908 may communicate with processors and peripheral devices in the second, third, and fourth power domains 902, 903, and 904.

The second power domain 902 includes a CPU 910 and a fabric A 912. The CPU 910 communicates with the peripheral devices via the peripheral fabric 908. The CPU communicates with the peripheral fabric 908 via fabric A 912.

The third power domain 903 includes a fabric B 914 and peripheral devices. The peripheral devices may include a DMA controller 916 and DRAM 918. The DMA controller 916 and the DRAM 918 communicate via the fabric B 914.

The fourth power domain 904 includes a fabric 920 and a master device having a wakeup timer (master) 922. The peripheral fabric 908 and the fabrics A, B, and C, 912, 914, and 920 include target agents and initiating agents to communicate with devices connected to the respective fabrics. Each of the peripheral devices may include a DPMU. Although not shown, each of the CPU 910, the peripheral fabric 908, and the fabrics A, B, and C, 912, 914, and 920 may also include a DPMU. An auxiliary power supply (VDDaux) may be supplied to the CPU 910, the DRAM 918, and the master 922 to maintain context in low-power modes.

Initially, the CPU 910 is in a C3 power state (i.e., off), and the power state of the DRAM 918 and the master 922 is D2. The master 922 transfers data to the DRAM 918 without intervention from the CPU 910 as follows.

The wakeup timer in the master 922 triggers a wake up of the master 922. The master 922 transitions from power state D2 to power state D0. The master 922 issues commands to transfer data from the master 922 to the DRAM 918 via DMA. Consequently, a target agent of fabric B 914 attaches to the DRAM 918 and triggers a wake up of the DRAM 918. The power state of the DRAM 918 transitions from D2 to D0.

The master 922 transfers data from the master 922 to the DRAM 918 via DMA. After the data is transferred, the master 922 initiates wakeup interface handshake and returns to the power state D2. The DRAM 918 includes an idle timer that expires when the DRAM 918 is idle for a predetermined time period. The DRAM 918 transitions from power state D0 to power state D2 when the idle timer expires.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a first device configured to communicate with a system bus;
a second device configured to communicate with the system bus, wherein the second device includes a device power management module configured to manage power states of the second device; and
a main power management module configured to manage power consumption of the second device independently of the first device by selectively supplying power and clock signals to the second device based on the power states of the second device,
wherein the main power management module and the device power management module each comprise a power handshake interface,
wherein the main power management module communicates with the device power management module via a power management bus using the power handshake interface, and
wherein the power handshake interface comprises
a wakeup interface configured to communicate wakeup control signals via the power management bus for transitioning the second device from a first one of the power states to a second one of the power states;
a power request interface configured to communicate power control signals via the power management bus for turning on/off power supplies to the second device; and
a clock request interface configured to communicate clock control signals via the power management bus for turning on/off clocks to the second device.

2. The system of claim 1, wherein the power management bus is separate from the system bus.

3. The system of claim 1, wherein the device power management module manages the power states based on control signals exchanged with the main power management module via the power management bus.

4. The system of claim 1, wherein:
the device power management module comprises control registers configured to store statuses of the power states and clocks of the second device; and
the main power management module manages the power consumption of the second device based on the statuses by writing to the control registers via a register bus.

5. The system of claim 4, wherein the register bus is separate from each of the system bus and the power management bus.

6. The system of claim 4, wherein when the main power management module reads or writes to the control registers, devices in a path from the main power management module to the device power management module are turned on.

7. The system of claim 4, wherein the power handshake interface of the main power management module and the device power management module each comprise a bus interface configured to:
interface the main power management module and the device power management module to the register bus; and
provide the main power management module with read/write access to the control registers.

8. The system of claim 1 further comprising:
a software sequencer configured to control sequencing of the power and clock signals to the second device based on controls generated by an operating system of the system; and
a sequencer module configured to control sequencing of the power and clock signals to the second device based on control signals received from the main power management module.

9. The system of claim 8, wherein the sequencer module communicates with the main power management module via a power management interface that is different than an interface used by the software sequencer to communicate with the main power management module and that is independent of the system bus.

10. The system of claim 8, wherein the sequencer module updates the sequencing of the power and clock signals when a configuration of the system is altered.

11. The system of claim 1 further comprising a subsystem that includes a subsystem device,
wherein the subsystem includes a subsystem power management module configured to manage power consumption of the subsystem device,
wherein the subsystem device includes a subsystem device power management module configured to manage power states of the subsystem device, wherein the subsystem power management module and the subsystem device power management module each comprise the power handshake interface, and wherein the subsystem power management module communicates with the main power management module and with the subsystem device power management module via the power management bus.

12. The system of claim 11, wherein the subsystem power management module selectively supplies the power and clock signals to the subsystem device based on the power states of the subsystem device and based on control signals exchanged with the main power management module via the power management bus.

13. The system of claim 1, wherein the main power management module comprises:
   a power control module configured to control the power supplied to the second device based on power states of devices in the system; and
   a clock control module configured to control the clock signals supplied to the second device based on clock states of devices in the system.

14. The system of claim 1, wherein the device power management module comprises:
   a power control module configured to control the power supplied to the second device based on power states of devices in a power domain of the system at includes the second device; and
   a clock control module configured to control the clock signals supplied to the second device based on clock states of devices in a clock domain of the system that includes the second device.

15. The system of claim 1 further comprising a monitoring module configured to:
   monitor parameters including a temperature of a portion of the system and an operating speed of a component of the system,
   wherein the main power management module manages the power consumption of the second device based on the parameters.

16. A system comprising:
   a first device configured to communicate with a system bus;
   a second device configured to communicate with the system bus, wherein the second device includes a device power management module configured to manage power states of the second device; and
   a main power management module configured to manage power consumption of the second device independently of the first device by selectively supplying power and clock signals to the second device based on the power states,
   wherein the device power management module comprises control registers configured to store statuses of the power states and clocks of the second device, and
   wherein the main power management module manages the power consumption of the second device based on the statuses by writing to the control registers via a register bus,
   wherein the register bus is different than the system bus, and
   wherein when the main power management module reads or writes to the control registers, one or more devices in a path from the main power management module to the device power management module are turned on.

17. The system of claim 16, wherein the main power management module and the device power management module each comprise a bus interface configured to:
   interface the main power management module and the device power management module to the register bus; and
   provide the main power management module with read/write access to the control registers.

* * * * *